(12) United States Patent
Li et al.

(10) Patent No.: US 10,581,577 B2
(45) Date of Patent: Mar. 3, 2020

(54) DATA SCHEDULING AND TRANSMISSION METHOD, APPARATUS, AND SYSTEM

(71) Applicant: ZTE CORPORATION, Guangdong (CN)

(72) Inventors: Xincai Li, Guangdong (CN); Wei Gou, Guangdong (CN); Yajun Zhao, Guangdong (CN); Feng Bi, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/772,770

(22) PCT Filed: Oct. 14, 2016

(86) PCT No.: PCT/CN2016/102179
§ 371 (c)(1),
(2) Date: Aug. 22, 2018

(87) PCT Pub. No.: WO2017/076157
PCT Pub. Date: May 11, 2017

(65) Prior Publication Data
US 2018/0367282 A1 Dec. 20, 2018

(30) Foreign Application Priority Data
Nov. 3, 2015 (CN) .......................... 2015 1 0738692

(51) Int. Cl.
*H04L 1/18* (2006.01)
*H04L 5/00* (2006.01)
(Continued)

(52) U.S. Cl.
CPC .......... *H04L 5/0055* (2013.01); *H04L 1/1887* (2013.01); *H04L 1/1896* (2013.01);
(Continued)

(58) Field of Classification Search
CPC combination set(s) only.
See application file for complete search history.

(56) References Cited

U.S. PATENT DOCUMENTS

| 2015/0172950 A1 | 6/2015 | Chen et al. |
| 2015/0173056 A1 | 6/2015 | Yerramalli et al. |

(Continued)

FOREIGN PATENT DOCUMENTS

| CN | 104539405 A | 4/2015 |
| CN | 104917597 A | 9/2015 |

OTHER PUBLICATIONS

International Search Report dated Jan. 5, 2017 for International Application No. PCT/CN2016/102179, 5 pages.
(Continued)

*Primary Examiner* — Thai Nguyen
(74) *Attorney, Agent, or Firm* — Knobbe Martens Olson & Bear LLP

(57) ABSTRACT

The present disclosure provides a data scheduling and transmission method, apparatus and system. The data scheduling method includes: configuring scheduling information according to a predetermined unlicensed-uplink-subframe scheduling mode, where the scheduling information is used for instructing a terminal to transmit uplink data on an unlicensed frequency spectrum; and receiving, according to the scheduling information, the uplink data sent by the terminal. This solves the problem of a reduced uplink data transmission efficiency due to a lack of a technology for reducing signaling overheads and improving an uplink transmission rate on an unlicensed frequency spectrum in the related art, thereby achieving effects of reducing the signaling overheads and improving the uplink transmission rate on the unlicensed frequency spectrum.

19 Claims, 7 Drawing Sheets

(51) Int. Cl.
*H04W 72/04* (2009.01)
*H04W 72/12* (2009.01)
*H04W 74/08* (2009.01)

(52) U.S. Cl.
CPC .......... *H04L 5/0044* (2013.01); *H04L 5/0094* (2013.01); *H04W 72/0446* (2013.01); *H04W 72/1215* (2013.01); *H04W 72/1268* (2013.01); *H04W 72/1252* (2013.01); *H04W 74/0808* (2013.01)

(56) References Cited

U.S. PATENT DOCUMENTS

| | | | |
|---|---|---|---|
| 2017/0048880 A1* | 2/2017 | Anderson | H04W 72/1226 |
| 2017/0134960 A1 | 5/2017 | Zhang | |
| 2018/0206269 A1* | 7/2018 | Bhorkar | H04L 5/00 |

OTHER PUBLICATIONS

Written Opinion of the International Searching Authority dated Jan. 5, 2017 for International Application No. PCT/CN2016/102179, 4 pages.

* cited by examiner

DATA SCHEDULING AND TRANSMISSION METHOD, APPARATUS, AND SYSTEM

TECHNICAL FIELD

The present disclosure relates to the field of communications and, in particular, to a data scheduling and transmission method, apparatus and system.

BACKGROUND

With the rapid growth of data services, data transmission pressure on carriers of a licensed frequency spectrum is also increasing. Therefore, using carriers of an unlicensed frequency spectrum to share data traffic on the carriers of the licensed frequency spectrum becomes an important evolution direction of a Long Term Evolution (LTE) system in the future.

In an LTE/LTE-A system, DCI Format 0 and DCI Format 4 may be used for uplink scheduling. Downlink Control Information (DCI) includes scheduling configuration parameters. The scheduling configuration parameters are generally divided into resource configuration parameters and transmission configuration parameters. The resource configuration parameters may be resource block allocation parameters, and the transmission configuration parameters may be a carrier indicator, a format identifier, a Modulation and Coding Scheme (MCS) level, a redundancy version (RV), a New Data Indicator (NDI), a Transmission Power Control (TPC) (TPC) command, etc. In addition, as a trade-off between control signaling overheads and scheduling flexibility, a synchronous adaptive or non-adaptive Hybrid Automatic Repeat Request (HARQ) mechanism is used in the LTE/LTE-A system, and the DCI does not need to include HARQ process numbers. For an asynchronous HARQ mechanism, DCI needs to include the HARQ process numbers of all data packets to distinguish different processes and implement data packet merging.

In a case where an unlicensed frequency spectrum has a low downlink load and a high uplink load, the base station just schedules uplink subframes, and for each uplink subframe, a corresponding downlink subframe is sent, causing a great waste of resources. In a case where a licensed carrier schedules other carriers across carriers, control signaling overheads of the licensed carrier is a bigger trouble. In addition, according to regional regulatory requirements, for uplink data transmission during unlicensed operation of LTE, a User Equipment (UE) needs to perform Listen-Before-Talk (LBT) before scheduling the data transmission in most cases, thus causing a low transmission efficiency of uplink data.

No specific solution has been provided to solve the problem of a reduced uplink data transmission efficiency due to a lack of a technology for reducing signaling overheads and improving an uplink transmission rate on an unlicensed frequency spectrum in the related art.

SUMMARY

Embodiments of the present disclosure provide a data scheduling and transmission method, apparatus and system to solve at least the problem of a reduced uplink data transmission efficiency due to a lack of a technology for reducing signaling overheads and improving an uplink transmission rate on an unlicensed frequency spectrum in the related art.

In an aspect of embodiments of the present disclosure, a data scheduling method is provided. The method includes: configuring scheduling information according to a predetermined scheduling mode of unlicensed uplink subframes, where the scheduling information is configured to instruct a terminal to transmit uplink data on an unlicensed frequency spectrum; and receiving the uplink data sent by the terminal according to the scheduling information.

Further, before the configuring the scheduling information according to the predetermined scheduling mode of the unlicensed uplink subframes, the method further includes: determining the scheduling mode according to a preset condition. The preset condition includes one of the following: a ratio of a downlink load to an uplink load of an unlicensed carrier is lower than a predefined threshold, the number of downlink subframes is less than the number of uplink subframes in one Transmission Opportunity (TXOP), and the uplink data consecutively fails to be received for k times within a predetermined period of time T, where k is an integer.

Further, the scheduling mode includes: scheduling at least one uplink data burst of the terminal each time. Each of the at least one uplink data burst includes m consecutive uplink subframes, and m is a positive integer greater than or equal to 1.

Further, the scheduling information includes: public scheduling information common to all scheduled subframes in one uplink data burst and private scheduling information of each of the all scheduled subframes in the one uplink data burst. The private scheduling information includes at least one of the following: a Listen-Before-Talk (LBT) type, a New Data Indicator (NDI), a Redundancy Version (RV) and a Hybrid Automatic Repeat Request (HARQ) process number.

Further, the configuring the scheduling information according to the predetermined scheduling mode of the unlicensed uplink subframes includes one of the following: when each subframe in the one uplink data burst is scheduled to carry a new data packet, the scheduling information including a combination of scheduling parameters that includes: the NDI, the RV and the HARQ process number; when all subframes in the one uplink data burst are scheduled to carry retransmitted data packets and initially-transmitted data packets corresponding to the retransmitted data packets share a combination of scheduling parameters, the scheduling information including the combination of scheduling parameters that includes: the NDI, the RV and the HARQ process number; and when the one uplink data burst is scheduled to carry new data packets and retransmitted data packets, allocating multiple combinations of scheduling parameters to the new data packets and the retransmitted data packets, where the combinations of scheduling parameters comprise: the NDI, the RV and the HARQ process number.

Further, the allocating multiple combinations of scheduling parameters to the new data packets and the retransmitted data packets includes one of the following: allocating one of the combinations of scheduling parameters to the new data packet and allocating one of the combinations of scheduling parameters to the retransmitted data packet. The one of the combinations of scheduling parameters includes: the NDI, the RV and the HARQ process number; and allocating a respective one of the combinations of scheduling parameters to each data packet.

Further, the configuring the scheduling information according to the predetermined scheduling mode of the unlicensed uplink subframes includes: when new data packets carried by the one uplink data burst being scheduled are erroneously received, configuring scheduling information for retransmitted data packets at next time to include one of the following: scheduling each of the retransmitted data packets separately; allocating a respective combination of scheduling parameters to each of the retransmitted data packets, where the respective combination of scheduling parameters include: the NDI, the RV and the HARQ process number; and scheduling a same combination of scheduling parameters for the retransmitted data packets.

Further, before the receiving the uplink data sent by the terminal according to the scheduling information, the method further includes: sending the scheduling information to the terminal. The sending the scheduling information to the terminal includes at least one of the following: carrying and sending the public scheduling information in the scheduling information through a downlink control channel; and carrying and sending, through a downlink data channel, at least one of the following: the private scheduling information, an LBT type, an LBT contention window, an LBT back-off indicator value, and a scheduled or transmitted burst length indicator, which are in the scheduling information.

Further, the sending the scheduling information to the terminal further includes one of the following: carrying the scheduling information through control information corresponding to existing control information format and sending the scheduling information to the terminal through the control information corresponding to existing control information format; and carrying the scheduling information through control information scrambled by a specific Radio Network Temporary Identity (RNTI) or control information corresponding to a configured control information format or transmission mode, and sending the scheduling information to the terminal through the control information scrambled by the specific RNTI or the control information corresponding to the configured control information format or transmission mode.

Further, the receiving the uplink data sent by the terminal according to the scheduling information includes one of the following: for same data packets in same uplink data, uniformly feeding back a New Data Indicator (NDI) and/or a response message; and for different data packets in the same uplink data, feeding back the NDI and/or the response message separately. The response message includes: ACK or NACK.

Further, the scheduling information further includes at least one of the following: the LBT type, an LBT contention window, an LBT back-off indicator value, a carrier indicator, a resource block indicator, a modulation and coding level, the HARQ process number, a scheduled or transmitted burst length indicator, and an uplink index.

Further, the LBT type includes: a full bandwidth energy detection, LBT on a partial bandwidth of a sub-band to which a scheduled Physical Resource Block (PRB) belongs or LBT on a partial bandwidth of the scheduled PRB, a predefined pattern detection, not performing LBT, performing LBT for only once, or LBT of multiple detection with back-off.

Further, instructing not performing LBT includes one of the following: when last scheduled data of a UE is received in a subframe N and it is found that the UE needs to schedule or transmit data in an uplink subframe N+1, instructing not performing LBT before the data is sent in the subframe N+1; when scheduled data of another UE is received in the subframe N and it is found that the UE needs to be scheduled in the uplink subframe N+1, instructing the UE not to perform LBT before sending the data in the subframe N+1; and when downlink data is sent in the subframe N and it is found that the UE needs to be scheduled in the uplink subframe N+1, instructing not performing LBT before the data is sent in the subframe N+1.

Further, instructing the LBT type includes one of the following: a first scheduled subframe is a first uplink subframe, instructing performing LBT on the full bandwidth; when the first scheduled subframe is not the first uplink subframe, instructing performing LBT at a scheduled sub-band level or a RB level or performing LBT on the predefined pattern detection. An LBT type of the predefined pattern detection includes: performing enhanced energy detection on last one or two symbols, detecting a cell-specific PUSCH RE muting pattern sent by another UE, or detecting sounding reference signal (SRS) comb frequency domain resource reservation pattern identifier.

Further, the carrying the scheduling information through the downlink data channel includes: carrying the scheduling information at DCI format 0 or 4 or at a predefined frequency domain position of a downlink data channel of a subframe where the public scheduling information of the scheduled subframes is located, and a Modulation and Coding Scheme (MCS) being a predefined value; carrying the scheduling information at DCI format 0 or 4 or at a frequency domain position of RRC message configuration of the downlink data channel of the subframe where the public scheduling information of the scheduled subframes is located; and carrying the scheduling information at DCI format 0 or 4 or at a frequency domain position of a downlink data channel indicated by a downlink control channel of the subframe where the public scheduling information of the scheduled subframes is located.

In an aspect of embodiments of the present disclosure, a data scheduling method is provided. The method includes: receiving scheduling information sent by a base station, wherein the scheduling information is configured to instruct a terminal to transmit uplink data on an unlicensed frequency spectrum; determining a transmission mode of the uplink data; performing Listen-Before-Talk (LBT) according to the transmission mode; and when the LBT is successful performed, sending the uplink data to the base station according to the scheduling information.

Further, the transmission mode of the uplink data is determined according to a preset condition. The preset condition includes one of the following: a format of downlink control information; display indication signaling in the downlink control information; a value of a transmitted or scheduled burst length indicator field in the scheduling information; a value of an uplink index in the scheduling information; by radio resource control (RRC) semi-persistent configuration signaling; by a specific Cell Radio Network Temporary Identifier (C-RNTI); and by a value of uplink scheduling interval (semiPersistSchedIntervalUL) being 1 which is a scheduling period parameter in RRC configuration information and a Semi-Persistent-Scheduled Cell Radio Network Temporary Identifier (SPS-C-RNTI).

Further, the performing LBT according to the transmission mode includes one of the following: when a first scheduled transmission subframe is a first uplink subframe, performing LBT on a full bandwidth; otherwise, performing LBT at a scheduled sub-band level or a RB level; performing LBT on the full bandwidth in a first scheduled subframe, and performing LBT on a partial bandwidth at the scheduled sub-band level or the scheduled RB level in a subsequent subframe; performing LBT on the full bandwidth in the first scheduled subframe, and performing LBT on a predefined pattern in the subsequent subframe; after performing LBT successfully in a Kth scheduled subframe, not performing LBT in the subsequent subframe, and consecutively transmitting m scheduled uplink subframes or (m−k+1) remaining scheduled subframes, where m denotes a number of scheduled subframes in an uplink data burst; performing LBT with back-off in the first scheduled subframe, and performing LBT without back-off or LBT with back-off values successively decreasing by one in the subsequent subframes; and when the terminal sends scheduled data in an UL subframe N and determines that the terminal also needs to send the scheduled data in an UL subframe N+1, not performing clear channel assessment (CCA) before the subframe N+1.

Further, the sending the uplink data to the base station according to the scheduling information includes one of the following: when only a combination of parameters is in the scheduling information, transmitting each scheduled subframe in the uplink data according to the combination of parameters; when multiple New Data Indicators (NDIs) and Hybrid Automatic Repeat Request (HARQ) process numbers are in the scheduling information, transmitting the new data packet or the retransmitted data packet of each scheduled subframe in the uplink data according to the NDIs and the HARQ process numbers; and when multiple NDIs and one HARQ process number are in the scheduling information, transmitting the new data packet according to the NDIs and a smallest one of corresponding HARQ process numbers and transmitting the a retransmitted data packet according to an original HARQ process number.

Further, the method further includes one of the following: when failing to perform LBT according to the transmission mode, performing LBT at a second Clear Channel Assessment (CCA) position of the uplink data until the last scheduled subframe in the uplink data; when failing to perform LBT according to the transmission mode, continuing performing LBT, and when a remaining length (m−k) of the uplink data is less than a threshold, stopping transmission, wherein m and k are positive integers and m is greater than k; and when failing to perform LBT according to the transmission mode, stopping transmission.

In another aspect of embodiments of the present disclosure, a data scheduling apparatus is provided. The apparatus includes: a first configuration module and a receiving module. The first configuration is configured to configure scheduling information according to a predetermined scheduling mode of unlicensed uplink subframes. The scheduling information is configured to instruct a terminal to transmit uplink data on an unlicensed frequency spectrum. The receiving module is configured to receive the uplink data sent by the terminal according to the scheduling information configured by the first configuration module.

Further, the apparatus further includes a second configuration module, which is configured to, determine the scheduling mode according to a preset condition before the scheduling information is configured according to the predetermined scheduling mode of the unlicensed uplink subframes. The preset condition includes one of the following: a ratio of a downlink load to an uplink load of an unlicensed carrier is lower than a predefined threshold; the number of downlink subframes is less than the number of uplink subframes in one Transmission Opportunity (TXOP); and the uplink data consecutively fails to be received for k times within a predetermined period of time T, where k is an integer.

Further, the scheduling mode includes: scheduling at least one uplink data burst of the terminal each time. Each of the at least one uplink data burst includes m consecutive uplink subframes, where m is a positive integer greater than or equal to 1.

Further, the scheduling information includes: public scheduling information common to all scheduled subframes in one uplink data burst and private scheduling information of each of the all scheduled subframes in the one uplink data burst. The private scheduling information includes at least one of the following: a Listen-Before-Talk (LBT) type, a New Data Indicator (NDI), a Redundancy Version (RV) and a Hybrid Automatic Repeat Request (HARQ) process number.

Further, the first configuration module includes one of the following: a first configuration unit, a second configuration unit, and a third configuration unit. The first configuration unit is configured to, when each subframe in the one uplink data burst is scheduled to carry a new data packet, configure the scheduling information to include a combination of scheduling parameters, where the combination of scheduling parameters include: the NDI, the RV and the HARQ process number. The second configuration unit is configured to, when all subframes in the one uplink data burst are scheduled to carry retransmitted data packets and initially-transmitted data packets corresponding to the retransmitted data packets share a combination of scheduling parameters, configure the scheduling information to include the combination of scheduling parameters, where the combination of scheduling parameters include the NDI, the RV and the HARQ process number. The third configuration unit is configured to, when the one uplink data burst is scheduled to carry new data packets and retransmitted data packets, allocate multiple combinations of scheduling parameters to the new data packets and the retransmitted data packets, where the combinations of scheduling parameters include: the NDI, the RV and the HARQ process number.

Further, the third configuration unit includes one of the following: a first configuration subunit and a second configuration subunit. The first configuration subunit is configured to allocate one of the combinations of scheduling parameters to the new data packets and allocate one of the combinations of scheduling parameters to the retransmitted data packets, respectively, wherein the one of the combinations of scheduling parameters comprises: the NDI, the RV and the HARQ process number.

Further, the first configuration module includes: a fourth configuration unit, which is configured to, when new data packets in the one uplink data burst being scheduled are erroneously received, configure scheduling information for retransmitted data packets at next time. The fourth configuration unit includes one of the following: a third configuration subunit, a fourth configuration subunit and a fifth configuration subunit. The third configuration subunit is configured to schedule each of the retransmitted data packets separately. The fourth configuration subunit is configured to allocating a combination of scheduling parameters to each of the retransmitted data packets separately, where the combination of scheduling parameters includes: the NDI, the RV and the HARQ process number. The fifth configuration subunit is configured to schedule a same combination of scheduling parameters for the retransmitted data packets.

Further, the apparatus further includes: a sending module, which is configured to send the scheduling information to the terminal before the uplink data sent by the terminal is received according to the scheduling information. The sending module includes at least one of the following: a first sending unit and a second sending unit. The first sending unit is configured to carry and send the public scheduling information in the scheduling information through a downlink control channel. The second sending unit is configured to carry and send through a downlink data channel at least one of the following: the private scheduling information, an LBT type, an LBT contention window, an LBT back-off indicator value, and a scheduled or transmitted burst length indicator, which are in the scheduling information.

Further, the sending module further includes one of the following: a third sending unit and a fourth sending unit. The third sending unit is configured to carry the scheduling information through control information corresponding to existing control information format and send the scheduling information to the terminal through the control information corresponding to existing control information format. The fourth sending unit is configured to carry the scheduling information through control information scrambled by a specific Radio Network Temporary Identity (RNTI) or control information corresponding to a configured control information format or transmission mode, and send the scheduling information to the terminal through the control information scrambled by the specific RNTI or the control information corresponding to the configured control information format or transmission mode.

Further, the receiving module includes at least one of the following: a first feedback unit and a second feedback unit. The first feedback unit is configured to uniformly feed back a New Data Indicator (NDI) and/or a response message for same data packets in same uplink data. The second feedback unit is configured to feed back the NDI and/or the response message separately for different data packets in the same uplink data, where the response message includes: ACK or NACK.

Further, the scheduling information further includes at least one of the following: the LBT type, an LBT contention window, an LBT back-off indicator value, a carrier indicator, a resource block indicator, a modulation and coding level, the HARQ process number, a scheduled or transmitted burst length indicator, and an uplink index.

Further, the LBT type includes: a full bandwidth energy detection, LBT on a partial bandwidth of a sub-band to which a scheduled Physical Resource Block (PRB) belongs or LBT on a partial bandwidth of the scheduled PRB, a predefined pattern detection, not performing LBT, performing LBT for only once, or LBT of multiple detection with back-off.

Further, instructing not performing LBT includes one of the following: when last scheduled data of a UE is received in a subframe N and it is found that the UE needs to schedule or transmit data in an uplink subframe N+1, instructing not performing LBT before the data is sent in the subframe N+1; when scheduled data of another UE is received in the subframe N and it is found that the UE needs to be scheduled in the uplink subframe N+1, instructing the UE not to perform LBT before sending the data in the subframe N+1; and when downlink data is sent in the subframe N and it is found that the UE needs to be scheduled in the uplink subframe N+1, instructing not performing LBT before the data is sent in the subframe N+1.

Further, the first configuration module is further configured to instruct the LBT type, where the LBT type includes one of the following: when a first scheduled subframe is a first uplink subframe, instructing performing LBT on the full bandwidth; when the first scheduled subframe is not the first uplink subframe, instructing performing LBT at a scheduled sub-band level or a RB level or performing LBT on the predefined pattern detection. An LBT type of the predefined pattern detection includes: performing enhanced energy detection on last one or two symbols, detecting a cell-specific PUSCH RE muting pattern sent by another UE, or detecting sounding reference signal (SRS) comb frequency domain resource reservation pattern identifier.

Further, the sending module is further configured to carry the scheduling information through the downlink data channel as follows: carrying the scheduling information at DCI format 0 or 4 or at a predefined frequency domain position of a downlink data channel of a subframe where the public scheduling information of the scheduled subframes is located, and a Modulation and Coding Scheme (MCS) being a predefined value; carrying the scheduling information at DCI format 0 or 4 or at a frequency domain position of RRC message configuration of the downlink data channel of the subframe where the public scheduling information of the scheduled subframes is located; and carrying the scheduling information at DCI format 0 or 4 or at a frequency domain position of a downlink data channel indicated by a downlink control channel of the subframe where the public scheduling information of the scheduled subframes is located.

In another aspect of embodiments of the present disclosure, a data scheduling apparatus is provided. The apparatus includes: a receiving module, a configuration module, a data processing module, and a sending module. The receiving module is configured to receive scheduling information sent by a base station, wherein the scheduling information is configured to instruct a terminal to transmit uplink data on an unlicensed frequency spectrum. The configuration module is configured to determine a transmission mode of the uplink data. The data processing module is configured to perform Listen-Before-Talk (LBT) according to the transmission mode determined by the configuration module. The sending module is configured to, when the LBT is successful, send the uplink data to the base station according to the scheduling information received by the receiving module.

Further, the configuration module includes: a configuration unit, which is configured to determine the transmission mode of the uplink data according to a preset condition. The preset condition includes one of the following: a format of downlink control information; display indication signaling in the downlink control information; a value of a transmitted or scheduled burst length indicator field in the scheduling information; a value of an uplink index in the scheduling information; by radio resource control (RRC) semi-persistent configuration signaling; by a specific Cell Radio Network Temporary Identifier (C-RNTI); and by a value of uplink scheduling interval (semiPersistSchedIntervalUL) being 1 which is a scheduling period parameter in RRC configuration information and a Semi-Persistent-Scheduled Cell Radio Network Temporary Identifier (SPS-C-RNTI).

Further, the data processing module includes one of the following: a first data processing unit, a second data processing unit, a third data processing unit, a fourth data processing unit, a fifth data processing unit and a sixth data processing unit. The first data processing unit is configured to, when a first scheduled transmission subframe is a first uplink subframe, perform LBT on a full bandwidth; when the first scheduled transmission subframe is not the first uplink subframe, perform LBT at a scheduled sub-band level or a RB level. The second data processing unit is configured to perform LBT on the full bandwidth in the first scheduled subframe, and perform LBT on a partial bandwidth at the scheduled sub-band level or the scheduled RB level in a subsequent subframe. The third data processing unit is configured to perform LBT on the full bandwidth in the first scheduled subframe, and perform LBT on a predefined pattern in the subsequent subframe. The fourth data processing unit is configured to, after LBT is performed successfully in a Kth scheduled subframe, not perform LBT in the subsequent subframe, and consecutively transmit m scheduled uplink subframes or remaining (m−k+1) scheduled subframes, where m denotes a number of scheduled subframes in an uplink data burst. The fifth data processing unit is configured to perform LBT with back-off in the first scheduled subframe, and perform LBT without back-off or LBT with back-off values successively decreasing by one in the subsequent subframes. The sixth data processing unit is configured to, when the terminal sends scheduled data in an UL subframe N and determines that the terminal also needs to send the scheduled data in an UL subframe N+1, not perform CCA before the subframe N+1.

Further, the sending module includes one of the following: a first sending unit, a second sending unit and a third sending unit. The first sending unit is configured to, when only one combination of parameters is in the scheduling information, transmit each scheduled subframe in the uplink data according to the combination of parameters. The second sending unit is configured to, when multiple New Data Indicators (NDIs) and Hybrid Automatic Repeat Request (HARQ) process numbers are in the scheduling information, transmit the new data packet or the retransmitted data packet of each subframe in the uplink data according to the NDIs and the HARQ process numbers. The third sending unit is configured to, when multiple NDIs and one HARQ process number are in the scheduling information, transmit the new data packet according to the NDIs and a smallest one of corresponding HARQ process numbers and transmitting the a retransmitted data packet according to an original HARQ process number.

Further, the apparatus further includes one of the following: a first performing unit, a second performing unit and a third performing unit. The first performing unit is configured to, when failing to perform LBT according to the transmission mode, perform LBT at a second Clear Channel Assessment (CCA) position of the uplink data until a last scheduled subframe in the uplink data. The second performing unit is configured to, when failing to perform LBT according to the transmission mode, continue performing LBT, and when a remaining length (m−k) of the uplink data is less than a threshold, stop transmission, wherein m and k are positive integers and m is greater than k. The third performing unit is configured to, when failing to perform LBT according to the transmission mode, stop transmission.

In another aspect of embodiments of the present disclosure, a data scheduling and transmission system is provided. The system includes: a base station and a terminal. The base station communicates with and is connected to the terminal. The base station is the data scheduling apparatus described above, and the terminal is the data transmission apparatus described above.

Through the present disclosure, scheduling information is configured according to a predetermined scheduling mode of unlicensed uplink subframes. The scheduling information is used for instructing a terminal to transmit uplink data on an unlicensed frequency spectrum. The uplink data sent by the terminal is received according to the scheduling information. This solves the problem of a reduced uplink data transmission efficiency due to a lack of a technology for reducing signaling overheads and improving an uplink transmission rate on an unlicensed frequency spectrum in the related art, thereby achieving effects of reducing the signaling overheads and improving the uplink transmission rate on the unlicensed frequency spectrum.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be detailed below with reference to the accompanying drawings in conjunction with the embodiments. If not in collision, the embodiments described herein and the features thereof may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
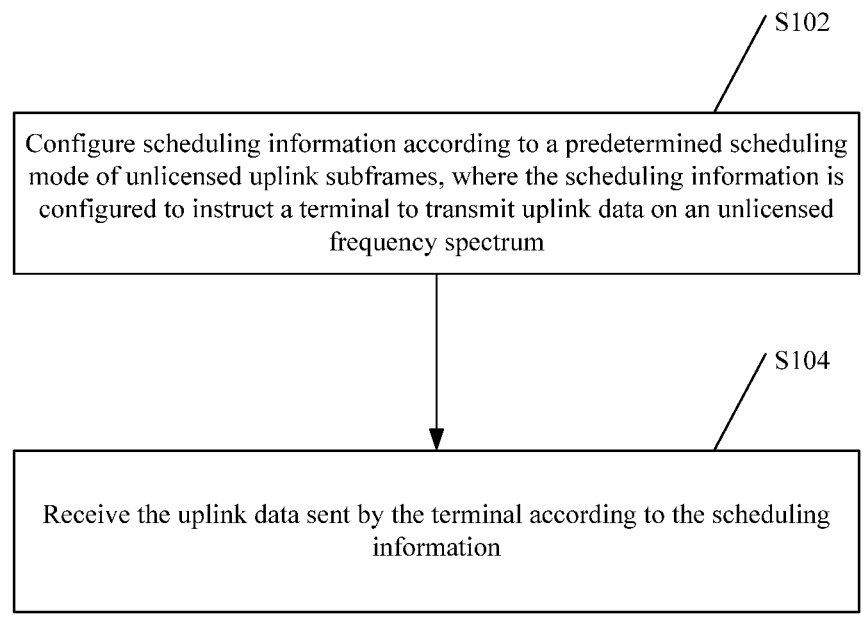
FIG. 1 is a flowchart of a data scheduling method according to an embodiment of the present disclosure.

This embodiment provides a data scheduling method. FIG. 1 is a flowchart of the data scheduling method according to an embodiment of the present disclosure. As shown in FIG. 1, at the base station side, the method includes the steps described below.

In step S102, scheduling information is configured according to a predetermined scheduling mode of unlicensed uplink subframes, where the scheduling information is used for instructing a terminal to transmit uplink data on an unlicensed frequency spectrum.

The data scheduling method provided by this embodiment of the present disclosure may be applicable to a Long Term Evolution (LTE/LTE-A) system, and may be particularly applied to a carrier service of an unlicensed frequency spectrum. In this embodiment of the present disclosure, the scheduling information may be transmitted by being encapsulated in Downlink Control Information (DCI).

Specifically, after determining the scheduling mode of the uplink subframes, the base station configures a transmission mode corresponding to transmission of the uplink data and configures scheduling information corresponding to the transmission mode. The scheduling information may be transmitted on a same unlicensed carrier where the uplink data is transmitted and which is obtained by the base station by contention. Alternatively, the scheduling information may be transmitted on a licensed carrier.

The scheduling information is carried by the existing DCI format 0 or 4, by a modified existing DCI format or by a newly defined DCI format. Alternatively, a part of public scheduling parameters in the scheduling information are carried in the existing DCI format and private scheduling parameters in the scheduling information are carried by a downlink data channel.

A length of burst of the scheduled uplink data transmission is displayed and indicated by modifying a definition of an existing UL index field in DCI 0 or 4, or determined by a predefinition, or indicated by a length indicator field of a new burst defined in DCI.

In step S104, the uplink data sent by the terminal is received according to the scheduling information.

Specifically, on the basis of step S102, when the base station receives the uplink data sent by the terminal according to the scheduling information, the base station blindly detects data packets and receives the data packets in the scheduled uplink subframes according to a timing relationship, and combines and demodulates the data according to a Hybrid Automatic Repeat Request (HARQ) process number.

In the data scheduling method provided by this embodiment of the present application, scheduling information is configured according to a predetermined scheduling mode of the unlicensed uplink subframes, where the scheduling information is used for instructing a terminal to transmit uplink data on an unlicensed frequency spectrum, and the uplink data sent by the terminal is received according to the scheduling information. This solves the problem of a reduced uplink data transmission efficiency due to a lack of technologies for reducing signaling overheads and improving an uplink transmission rate on an unlicensed frequency spectrum in the related art, thereby achieving effects of reducing the signaling overheads and improving the uplink transmission rate on the unlicensed frequency spectrum.

Preferably, before the scheduling information is configured according to the predetermined scheduling mode of the unlicensed uplink subframes in step S102, the data scheduling method further includes the step described below.

In step S101, the scheduling mode is determined according to a preset condition. The preset condition includes one of the following: a ratio of a downlink load to an uplink load of the unlicensed carrier is lower than a predefined threshold (For example, the downlink load and the uplink load are compared with a first threshold and a second threshold respectively. When the downlink load is less than the first threshold, the downlink load of the unlicensed carrier is considered low; similarly, when the uplink load is greater than the second threshold, the uplink load is considered high. The first threshold and the second threshold may be set according to actual conditions, and may be equal or unequal.); the number of downlink subframes is less than the number of uplink subframes in one Transmission Opportunity (TXOP); and the uplink data consecutively fails to be received for k times within a predetermined period of time T, where k is an integer.

In the data scheduling method provided by this embodiment of the present application, the terminal may be a user equipment such as a smart phone, a laptop, a tablet, a wearable device or a handheld business device, and the scheduling mode herein includes scheduling an uplink (UL) data transmission burst of one UE each time. When the number of uplink subframes included in the burst is 1, the scheduling mode is an existing single-subframe scheduling, and when the number of uplink subframes included in the burst is greater than 1, the scheduling mode is scheduling of consecutive multiple subframes. In the data scheduling method provided by this embodiment of the present application, the number of uplink subframes included in the burst is greater than 1, that is, the data scheduling method provided by this embodiment of the present application is used for scheduling consecutive uplink multiple subframes.

In an alternative embodiment, when the downlink load of the unlicensed carrier is low and the uplink load the unlicensed carrier is high, the base station uses one downlink subframe to schedule multiple uplink subframes. Alternatively, when the number of downlink subframes is less than the number of uplink subframes in one TXOP, the base station may use one downlink subframe to schedule multiple uplink subframes. Alternatively, when the base station consecutively fails to receive the uplink scheduling data or consecutively fails to receive correct uplink scheduling data for k times within a predetermined period of time T, the base station may use one downlink subframe to schedule multiple uplink subframes.

Specifically, how the base station determines the number of subframes scheduled each time by the scheduled UE, that is, the process of determining scheduling mode by the base station includes at least one of the following cases.

In case 1: when LBT detection of the UE is unsuccessful for a long time, the base station may schedule that one UL burst include multiple consecutive uplink subframes.

Alternatively, in case 2: when m data packets of a UE consecutively received by the base station are negative-acknowledgement (NACK), the base station may schedule the UE in such a way that one UL burst includes multiple consecutive uplink subframes.

Alternatively, in case 3: on an unlicensed carrier, in a TXOP after the base station successes in competition firstly, when the number of downlink subframes is less than the number of uplink subframes, the base station may use one downlink subframe on the unlicensed carrier to schedule multiple uplink subframes.

Alternatively, in case 4: when the downlink load is low and the uplink load is high, the base station may schedule multiple uplink subframes in one unlicensed downlink subframe.

At the same time, the base station determines the number of uplink subframes scheduled on the unlicensed carrier according to the sixe of the Buffer Status Report (BSR) of the UE and a transmission amount of licensed carriers.

Further, the scheduling mode determined in step S101 includes:

at least one uplink data burst of the terminal is scheduled each time, where each of the at least one uplink data burst includes m consecutive uplink subframes, where m is a positive integer greater than or equal to 1.

The number of scheduled uplink subframes included in the burst is carried by the existing UL index field in the downlink control information format 0 or format 4, or carried by a new definition field-scheduling or length indicator field of a transmission burst, or determined by a predefined length.

Further, the scheduling information includes: public scheduling information common to all scheduled subframes in one uplink data burst and private scheduling information of each of the all scheduled subframes in the one uplink data burst, where the private scheduling information includes at least one of the following: a Listen-Before-Talk (LBT) type, a New Data Indicator (NDI), a Redundancy Version (RV) and a Hybrid Automatic Repeat reQuest (HARQ) process number.

Preferably, in step S102, the process of configuring the scheduling information according to the predetermined scheduling mode of unlicensed-uplink-subframes may be implemented by using one of the following modes:

Mode 1: when each subframe in the one uplink data burst is scheduled to carry a new data packet, the scheduling information includes a combination of scheduling parameters, which includes: the NDI, the RV and the HARQ process number.

Specifically, when multiple subframes in the burst are all new packets, versions of the NDIs are the same, versions of the RVs are the same, and HARQ process numbers share a process number, and when a corresponding part of new packets in one scheduling are scheduled and retransmitted together, the NDIs are same, the RVs are same and the HARQ process numbers are same.

Mode 2: when the all subframes in the one uplink data burst are scheduled to carry retransmitted data packets and initially-transmitted packets corresponding to the retransmitted data packets share one combination of scheduling parameters, the scheduling information includes the combination of scheduling parameters, where the combination of scheduling parameters includes: the NDI, the RV and the HARQ process number.

Specifically, when all subframes in one scheduled burst carry retransmitted data packets and initially-transmitted packets corresponding to the retransmitted data packets are also scheduled together and share the same NDI, RV and HARQ process number, one combination of scheduling parameters including NDI, RV and HARQ process number is also provided in the DCI corresponding to this scheduling of retransmitted data packets and these data packets share this combination of scheduling parameters.

Mode 3: when the all subframes in the one uplink data burst are scheduled to carry new data packets and the retransmitted packets, multiple combinations of scheduling parameters are allocated to the new data packets and the retransmitted data packets, where the multiple combination of scheduling parameters include: the NDI, the RV and the HARQ process number.

Specifically, only new data packets are included in the burst, each of the retransmitted packets is scheduled separately and retransmitted adaptively, or retransmitted packets are scheduled together, or retransmitted packets are scheduled on a licensed carrier.

When there are new data packets and retransmitted packets in the burst, the NDIs of the data packets are each indicated independently and are in one-to-one correspondence with bitmaps of scheduled subframes, and the process numbers of the data packets are also each indicated independently and are in one-to-one correspondence with the bitmaps of scheduled subframes; or only the process number indicator of the first one of the scheduled subframes is given and process numbers of other scheduled subframes correspond to the smallest one of available process numbers.

Optionally, when there are both new data packets and retransmitted packets in the burst, the retransmitted packets are scheduled in late ones of the consecutive subframes.

In addition, the base station may also provide NDI information of each scheduled subframe and HARQ process number information of the first scheduled subframe.

Further, in the above mode 3, the multiple combinations of scheduling parameters are allocated to the new data packets and the retransmitted packets by using at least one of the following modes.

HARQ process numbers corresponding to k subframes included in the UL burst in the data scheduling method provided by this embodiment of the present application are determined as follows: In a case of uplink synchronous HARQ, it is not needed to give HARQ process number indication information in DCI; and in a case of uplink asynchronous HARQ, the base station needs to give HARQ process number indication information of at least the first scheduled uplink subframe. Process numbers of all subframes are determined by using the following allocation modes.

Allocation mode 1: the new data packets and the retransmitted packets are each allocated with a combination of scheduling parameters, where the combination of scheduling parameters includes: the NDI, the RV and the HARQ process number.

Specifically, when the data packets transmitted by the k subframes are all new data packets, the k subframes may share the same process number and are scheduled together when retransmitted later.

For example, at the first time, four consecutive subframes, which are uplink subframes 1, 2, 3 and 4, are scheduled. Transmitted data packets of the four subframes are all new data packets. The four subframes share the process number 2. Then the base station receives and demodulates the four data packets. It is found that data packets of the subframes 1 and 3 are erroneously received and need to be retransmitted. Thus, when scheduled at the next time, retransmitted packets of the subframes 1 and 3 are scheduled together and still share the process number 2. The same is done for packets retransmitted subsequently. The process number is released only when the four data packets are all correctly transmitted.

Allocation mode 2: a combination of scheduling parameters is allocated to each packet.

Specifically, each data packet has an individual HARQ process number. The individual HARQ process numbers of the data packets are indicated as follows.

Mode 1: The process number of each data packet is given in DCI signaling.

For example, the number of bits included in each field corresponds to the number of multiple subframes. For example, if four subframes are scheduled, the NDI is given by four bits and correspond to bitmap of the scheduled subframe.

Alternatively, each subframe corresponds to one combination of scheduling parameters. The first combination of scheduling parameters corresponds to the first scheduled subframe. The second combination of scheduling parameters corresponds to the second scheduled subframe. For example, indication information of the first subframe is 001, indicating that NDI is 0 and RV is 1; and indication information of the second subframe is 110, indicating that NDI is 1 and RV is 2.

Mode 2: in DCI signaling, only the HARQ process number of the first scheduled subframe and the NDI information of each subframe are given. HARQ process numbers of subsequent subframes are determined by a predefined rule. The predefined rule is to select the smallest one from available process numbers each time.

For example, indexes of uplink subframes scheduled at the first time are 2, 3, 4 and 5, and HARQ process numbers of uplink subframes scheduled at the first time are 1, 2, 3 and 4 respectively. The base station fails to decode data packets of the second and third subframes, and the first and fourth subframes are correctly transmitted, so the process numbers 1 and 4 can be released. In the next scheduling, it is assumed that the base station still schedules four subframes, including two retransmitted packets corresponding to the process numbers 2 and 3 in the first scheduling, and two new data packets. Then, the base station gives the information about whether the scheduled four packets corresponding to the NDI information 0110 bitmap are new packets or retransmitted packets and then gives that the process number of the first subframe is 1, and then the UE determines that the process number information of the remaining three subframes according to the rule that retransmitted packets use original process numbers and new packets use the smallest one of available process numbers.

Further, the process of configuring the scheduling information according to the predetermined scheduling mode of unlicensed uplink subframes in step S102 includes:

When new data packets in the scheduled uplink data burst are erroneously received, scheduling information of the retransmitted packet at next time is configured by using one of the following modes:

In the data scheduling method provided by this embodiment of the present application, retransmitted packets are scheduled on an unlicensed carrier by using one of the following modes:

Mode 1: Each retransmitted packet is scheduled separately.

Specifically, the retransmitted packet is scheduled in a single-subframe scheduling manner, that is, each retransmitted packet is not scheduled together with other subframes. In this way, the HARQ process number and the NDI information of each retransmitted packet can be given by DCI individually. Moreover, adaptive retransmission may be used for each retransmitted packet, that is, the retransmitted packets do not have the completely identical transmission parameters as the first scheduling.

Mode 2: a combination of scheduling parameters is allocated to each retransmitted packet separately, where the combination of scheduling parameters includes: the NDI, the RV and the HARQ process number.

Mode 3: the same combination of scheduling parameters is scheduled.

Specifically, the retransmitted packets are retransmitted together each time. That is, a part of retransmitted packets corresponding to new data packets in the previous one scheduling are scheduled together at this time. For example, when a UL burst including m new data packets is scheduled at the first time and n (n is less than or equal to m) data packets need to be retransmitted, the n retransmitted packets can be scheduled together still by using one DCI at the second time.

In addition, the data scheduling method provided by this embodiment of the present application further includes:

Mode 4: retransmitted packets are scheduled on a licensed carrier.

Mode 5: retransmitted packets are sent in late ones of multiple subframes. When DCI shows NDIs and HARQ process numbers of all subframes, to reduce the effect of an LBT failure on the decrease of transmission probability of retransmitted packets, the retransmitted packets are scheduled as far as possible to late uplink subframes of a burst.

Further, before the uplink data sent by the terminal is received according to the scheduling information in step S104, the data scheduling method provided by this embodiment of the present application further includes the step described below.

In step S103, the scheduling information is sent to the terminal.

In step S103, the scheduling information is sent to the terminal by using at least one of the following modes:

Mode 1: the public scheduling information in the scheduling information is carried and sent through a downlink control channel.

Mode 2: at least one of the public scheduling information in the scheduling information, an LBT type, an LBT contention window, an LBT back-off indicator value, and a scheduled or transmitted burst length indicator are carried and sent through a downlink control channel.

Specifically, in combination with the modes 1 and 2, in the process of sending the scheduling information to the terminal in this embodiment of the present application, downlink control information is divided into two parts, that is, public scheduling indication information common to all scheduled subframes in one transmission burst and private scheduling indication information of each scheduled subframe in the transmission burst. The public scheduling information is carried by an existing control information format. The private scheduling information is carried by a downlink data channel.

Further, the process of sending the scheduling information to the terminal in step S103 further includes at least one of the followings.

In the process of sending the scheduling information to the terminal in this embodiment of the present application, the scheduling information is carried by the existing DCI format 0 or 4, by a modified existing DCI format or by a newly defined DCI format. Alternatively, part of the public scheduling information is carried by the existing DCI format and the private scheduling information is carried by the downlink data channel.

Mode 1: the scheduling information is carried by control information corresponding to an existing control information format and is sent to the terminal.

On the basis of the above, the process of carrying and sending the scheduling information through the existing DCI format 0 or 4 is as follows:

(1) In this embodiment of the present application, the method of scheduling an uplink burst by using the existing DCI format 0 is implemented as follows:

When no aperiodic CSI reporting is triggered in the subframe in which the DCI is sent, that is, CSI request bit field values in the DCI are all 0, and when synchronous HARQ is adopted in the uplink, DCI format 0 can be reused to schedule one uplink transmission burst of LAA. At this time, the burst includes at least one uplink subframe and, preferably, includes m consecutive (m is greater than or equal to 1) uplink subframes.

In this case, when the UE performs LBT before data transmission, the LBT parameter value is a predefiend value, for example, the LBT is only performing a detection with a predefined period of time (such as 25 microseconds or 34 microseconds); or the UE does not need to perform LBT; or the UE performs LBT whose back-off value is a predefined value.

Specifically, m (m is greater than or equal to 1) consecutive uplink subframes included in this scheduled burst have identical scheduling indication information. For example, indication information field names and the corresponding number of bits given in the DCI content are listed in Table 1 below.

TABLE 1

| DCI Bit Field Name | Number of Bits |
|---|---|
| Carrier indicator | 3 |
| DCI format indicator | 1 |
| Centralized/distributed differentiation identifier | 1 |
| Frequency hopping identifier | 1 |
| Resource allocation type | 1 |
| Resource block allocation | K |
| Transmission burst length indicator field | 2 |
| Modulation and coding level and redundancy version indicator $I_{MSC}$ | 5 |
| TPC command | 2 |
| CRC field | 16 |
| CSI request | 1 or 2 |
| SRS request | 0 or 1 |
| NDI | 1 |

The transmission burst length indicator field is to reuse an uplink index (UL index) bit field in the original DCI or a 2 bits field in a Downlink Assignment Index (DAI). The transmitted burst length indicator field is used to indicate the length of the UL burst, that is, the number of consecutive uplink subframes. For example, 00 represents one subframe, 01 represents 2 subframes, 10 represents 3 subframes, and 11 represents 4 subframes.

Since the m uplink subframes share one combination of scheduling parameters, the m consecutive subframes have the same scheduling information, such as modulation and coding level and redundancy version indication information. For the resource block allocation information, the m subframes may be completely the same, and the resource block size and location may be determined according to the resource block indication information and the resource allocation type. Alternatively, frequency domain shift information is predefined, for example, p Physical Resource Blocks (PRBs). The indication information just gives the resource block information of the first subframe, and the frequency domain position of each of the subsequent scheduled subframes is shifted upwards from the previous subframe by p PRBs. Alternatively, n (n is greater than 1 and less than m) subframes are used to predefine frequency hopping p' PRBs.

In this case, the data packets carried by each subframe in the burst are all new data packets or correspond to retransmitted packets of part of multiple new data packets in the previous one scheduling. That is, at the first time, a DCI format 0 is used to schedule one UL burst containing m new data packets. n (n is less than or equal to m) data packets among the m new data packets need to be retransmitted. At the second time, this DCI format 0 can still be used to schedule the n retransmitted packets together. Either adaptive retransmission or non-adaptive retransmission is applicable.

In this case, the UE determines, through the UL burst value, that the scheduling mode is to schedule one UL burst each time, where the burst includes k consecutive uplink subframes. Then the UE prepares a data packet for each subframe in the corresponding burst according to the DCI information.

(2) In this embodiment of the present application, the method for scheduling an uplink burst by reusing the existing DCI format 4 is as follows:

In this embodiment, the method for scheduling an uplink burst by reusing the existing DCI format 4 is described.

The burst length is predefined to be 2 ms, that is, two uplink subframes. MCS level and NDI information of the original two transmission blocks are reused as MCS level and NDI information of the transmission blocks corresponding to the two subframes included in the scheduled one UL burst.

Details are listed in Table 2 below.

TABLE 2

| DCI Bit Field Name | Number of Bits |
|---|---|
| Carrier indicator | 3 |
| DCI format indicator | 1 |
| Centralized/distributed differentiation identifier | 1 |
| Frequency hopping identifier | 1 |
| Resource allocation type | 1 |
| Resource block allocation | K |
| DAI | 2 |
| TPC command | 2 |
| CRC field | 16 |
| LBT parameter indicator or HARQ process number indicator | 3 |
| CSI request | 1 or 2 |
| SRS request | 0 or 1 |
| Modulation and coding level and redundancy version indicator $I_{MSC}$ (the first subframe in the burst) | 5 |
| NDI (the first subframe in the burst) | 1 |
| Modulation and coding level and redundancy version indicator $I_{MSC}$ (the second subframe in the burst) | 5 |
| NDI (the second subframe in the burst) | 1 |

In this case, the type and/or parameter of the LBT performed by UE is still predefined or notified by high-level information. Alternatively, the original Demodulation Reference Signal (DMRS) cyclic shift and Orthogonal Convolutional Code (OCC) index bit field are used to indicate a back-off value of the LBT. For example, 001 represents the back-off value N of LBT=2. Alternatively, HARQ process number information. Different from the use of format 0, the use of format 4 enables scheduling of new data packets and retransmitted packets together and different Modulation and Coding Scheme (MCS) and RV version configurations of two data packets. For example, at the first time, two new data packets are scheduled, the corresponding NDI bit fields in the DCI are all 00, and then the UE transmits two consecutive subframes according to the scheduling information, but the base station correctly receives the data packet of the first subframe and erroneously receives the data packet of the second subframe. At the next scheduling, it is feasible to send NDI bit 10 to indicate scheduling one new data packet and one retransmitted data packet together and configure the MSC of the new data packet and the MSC of the retransmitted packet separately. For example, the MCS and RV bit field value of the new packet is 100 and the MCS and RV bit field value of the retransmitted packet of the second subframe is 110. Other scheduling configuration parameters of the two data packets are identical.

Mode 2: The scheduling information is sent to the terminal, where the scheduling information is carried by control information corresponding to a configured control information format or transmission mode.

(3) In this embodiment of the present application, the process of implementing the method for scheduling an uplink burst by modifying an existing DCI format 0 or format 4 or defining a new DCI format X is described below.

In this embodiment of the present application, the process of implementing the method for scheduling an uplink burst by modifying an existing DCI format 0 or format 4 or defining a new DCI format X is described in detail.

The DCI information includes two parts: a public combination of scheduling parameters common to all scheduled subframes and private scheduling information of each scheduled subframe. The included m combinations of scheduling parameters are in bitmap correspondence with m subframes included in the burst.

That is, each set of consecutive subframes or subframes in one UL burst share a partially same set of DCI scheduling parameters. Public DCI and private DCI are listed in Table 3 below.

TABLE 3

|  | DCI Bit Field Name | Number of Bits |
| --- | --- | --- |
| Public DCI | LBT indicator | 0 or 1 or 2 or 3 |
|  | Carrier indicator | 3 or 5 |
|  | DCI format indicator | 1 |
|  | Centralized/distributed differentiation identifier | 1 |
|  | Frequency hopping identifier | 1 |
|  | Resource block allocation |  |
|  | UL index or NAI | 2 |
|  | Modulation and coding level | 5 |
|  | TPC command | 2 |
|  | CRC field | 16 |
|  | CSI request | 1 or 2 |
|  | Scheduled burst length indicator field | 0 or 2 or 3 or 4 |
|  | SRS request | 0 or 1 |
| Private DCI | NDI | 1*m |
|  | HARQ process number | 4*m |

The LBT related parameter indication information includes at least one of the following: an LBT type, an LBT, an LBT contention window and an LBT back-off value.

The LBT type includes one of the following: the type of the of the LBT includes a full bandwidth energy detection, LBT on a partial bandwidth of a sub-band to which a scheduled Physical Resource Block (PRB) belongs or LBT on a partial bandwidth of the scheduled PRB, a predefined pattern detection, not performing LBT, performing LBT for only once, or LBT of multiple detection with back-off. The LBT contention window includes 3, 7, 15, 31 and 63. The LBT back-off value is a positive integer less than or equal to the contention window.

A case where the number of bit fields is zero indicates that the value of the length of the scheduled burst, that is, the number of consecutive uplink subframes included in one scheduling, is a predefined value, such as 1 ms, 2 ms or 4 ms. When the number of bit fields is not zero, the value of the length of the scheduled burst is determined according to the value of the number of bit fields. For example, 110 indicates that 7 consecutive uplink subframes are scheduled.

Each scheduled subframe gives the corresponding NDI information and HARQ process number index information, through which uplink asynchronous HARQ can be implemented. The original 1-bit NDI information is modified to m-bit bitmap corresponding to m scheduled subframes. The 4*m-bit HARQ process number indexes correspond to the HARQ process numbers of m data packets.

Further, instructing the type of LBT includes one of the following: when a first scheduled subframe is a first uplink subframe, instructing performing a full bandwidth LBT; otherwise, instructing performing LBT on a scheduled subband or on a scheduled Resource Block (RB) level or performing LBT of a predefined pattern detection. The type of LBT of the predefined pattern detection includes: performing enhanced energy detection on last one or two symbols to detect a cell-specific PUSCH RE muting pattern or sounding reference signal (SRS) comb frequency domain resource reservation pattern identifier sent by another UE.

Further, the carrying the scheduling information through the downlink data channel includes: carrying the scheduling information at DCI format 0 or 4 or carrying the scheduling information at a predefined frequency domain position of the downlink data channel of a subframe where the public scheduling information of the scheduled subframes is located, and a modulation and coding scheme (MCS) being a predefined value; carrying the scheduling information at DCI format 0 or 4 or carrying the scheduling information at a frequency domain position of RRC message configuration of the downlink data channel of the subframe where the public scheduling information of the scheduled subframes is located; and carrying the scheduling information at the DCI format 0 or 4 or carrying the scheduling information at a frequency domain position of a downlink data channel indicated by a downlink control channel of the subframe where the public scheduling information of the scheduled subframes is located.

In addition, optionally, the private DCI content can be carried not only by the control channel but also by a downlink traffic channel. The carrying mode is as follows.

Some configuration information is carried by the bit field of the existing DCI format 0 or 4. Remaining configuration information, namely the following scheduling indicating information, such as one or more of LBT parameter, length of the scheduled transmission burst, HARQ process number, RV and NDI is carried by a PDSCH channel.

This information is sent at the predefined frequency domain position of the downlink data channel, for example, in the kth PRB position of the system bandwidth. k is a predefined value, or a value indicated dynamically by a DL grant, or a value semi-statically configured through an RRC message. The specific subframe is the same as the subframe carrying other UL grant scheduling information.

The MCS level and other transmission information are predefined, for example, MCS=9, for the mode of sending new information (for example, one or more of LBT parameter, scheduled and transmitted burst length, HARQ process number, RV and NDI) at the predefined frequency domain position of the downlink data channel. The UE first blindly detects the DCI format 0 or 4 in the downlink control channel to obtain part of uplink scheduling information, and then receives the remaining scheduling information in the predefined position of the downlink data channel of the same subframe. Then these two parts are merged to form the complete DCI information of this scheduling.

Alternatively, the terminal first receives the frequency domain position information of the new scheduling information configured by the RRC message in the downlink data channel, and then, in the subframe where the DCI format 0 or 4 is located, the terminal receives the remaining scheduling indication information at the frequency domain position of the new scheduling information configured by the RRC message in the downlink data channel after processing the control channel.

Alternatively, the terminal obtains the dynamic frequency domain position information of the new scheduling information in the downlink data channel by receiving the DL grant, and then receives and decodes this information in the corresponding frequency domain position to obtain the new scheduling information. Then, the UL grant information in the DCI is merged to form all indication information of the complete uplink scheduling.

In this mode, the UE determines the scheduling mode through the transmission mode to which the DCI format X belongs, and then blindly detects the DCI according to this format to determine the values of the scheduling parameters. Then, the UE performs resource contention on the carrier indicated by the scheduling according to the scheduling configuration parameters. After the contention succeeds, the UE sends the uplink transmitted burst according to the parameters.

Further, the uplink data sent by the terminal is received according to the scheduling information by using one of the following modes:

Mode 1: For same data packets in same uplink data, a New Data Indicator (NDI) and/or a response message is fed back uniformly.

Mode 2: For different data packets in the same uplink data, the NDI and/or the response message is fed back separately.

The response message includes: ACK or NACK.

In combination with the mode 1 and the mode 2, the base station decodes same data packets of the same UE and feeds back one NDI, and receives different data packets separately and feeds back the NDI separately.

Alternatively, when the base station detects that the proportion of the data packet NACK (including DTX) in the burst exceeds the threshold, the base station may send new scheduling information immediately even if the burst has not been completely transmitted or decoded. The new information may include a new LBT parameter determined by the base station according to the NACK, and new scheduling resource configuration information. For example, the frequency domain position of the burst may be adjusted to another bandwidth or may be shifted by a predefined size or a size indicated by signaling.

Figure 2:
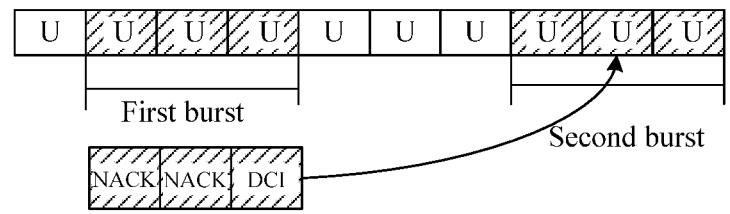
FIG. 2 is a schematic diagram illustrating that a base station schedules a UE to transmit data in three uplink subframes according to an embodiment of the present disclosure.

FIG. 2 is a schematic diagram illustrating that a base station schedules a UE to transmit data in three uplink subframes according to an embodiment of the present disclosure. As shown in FIG. 2, the base station schedules the UE to transmit data in three uplink subframes. Since the UE fails in contention and fails to transmit data, the data packets of the first two subframes received by the base station are interference. In this case, the base station immediately sends new DCI information to the UE. This information may indicate a new scheduled carrier or the new resource position of this carrier.

Further, the scheduling information further includes at least one of the following: the LBT type, an LBT contention window, an LBT back-off indicator value, a carrier indicator, a resource block indicator, a modulation and coding level, the HARQ process number, a length indicator of a scheduled or transmitted burst, and an UL index.

Further, the LBT type includes: a full bandwidth energy detection, a partial bandwidth energy detection of a scheduled PRB or a sub-band LBT of a scheduled radio carrying resource block (RB), a predefined pattern detection, not performing LBT, performing LBT for only once, or LBT of multiple detection with back-off.

Further, instructing not performing LBT refers to: when last scheduled data of a UE is received in a subframe N and it is found that the UE needs to schedule or transmit data in an uplink subframe N+1, instructing not performing LBT before the data is sent in the subframe N+1;

when scheduled data of another UE is received in the subframe N and it is found that the UE needs to be scheduled in the uplink subframe N+1, instructing the UE not to perform LBT before sending the data in the subframe N+1; and when downlink data is sent in the subframe N and it is found that the UE needs to be scheduled in the uplink subframe N+1, instructing not performing LBT before the data is sent in the subframe N+1.

Further, when the base station instructs the UE to perform a mode of a UL CCA or a parameter of a CCA, if after notifying the UE to perform the parameter of the CCA before the UE sends data in the UL subframe N, the base station finds that the UE also needs to send data in the UL subframe N+1, then the base station configures the UE not to perform CCA or performs CCA of one CCA slot before the UE sends data in the subframe N+1.

For example, at the first time, the base station schedules the UE to transmit data in subframes 1, 2, 3, 4 and 5. In an uplink data transmission process, for example, in subframe 2, the base station suddenly finds that the UE has other data to be scheduled on this carrier, so when the base station sends scheduling information to the UE, the base station instructs the UE not to perform CCA and to directly transmit scheduling data for the second time immediately after the first time transmission of the scheduled data is completed or instructs the UE to perform CCA of only one CCA slot when the UE transmits data in subframe 6.

Embodiment 2

Figure 3:
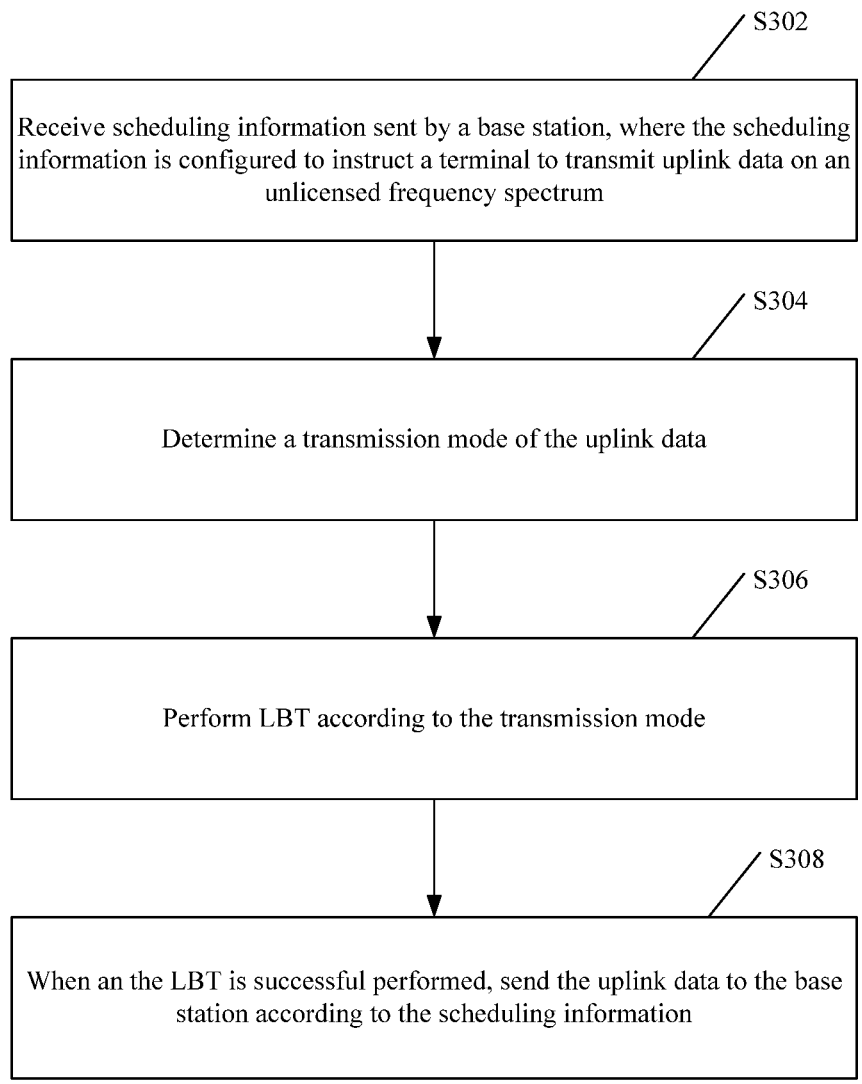
FIG. 3 is a flowchart of a data transmission method according to an embodiment of the present disclosure.

This embodiment provides a data transmission method. FIG. 3 is a flowchart of the data transmission method according to an embodiment of the present disclosure. As shown in FIG. 3, at a terminal, the method includes the steps described below.

In step S302, scheduling information sent by a base station is received. The scheduling information is used for instructing a terminal to transmit uplink data on an unlicensed frequency spectrum.

The data transmission method provided by this embodiment of the present application may be applicable to a Long Term Evolution (LTE/LTE-A) system, and may be particularly applied to a carrier service of an unlicensed frequency spectrum. In this embodiment of the present application, the scheduling information may be transmitted by being encapsulated in Downlink Control Information (DCI).

In step S304, a transmission mode of the uplink data is determined.

The terminal determines the format of the DCI through the transmission mode, and then determines the transmission mode of multiple consecutive subframes according to the indication information in the format.

Specifically, the terminal blindly detects the DCI and/or parses indication information of transmission or scheduling UL indexes in the DCI to determine length indication information of the burst, thereby determining specific uplink subframe indexes of this scheduling.

Alternatively, specific uplink subframe indexes of this scheduling are determined through the SPS-C-RNTI identifier and whether the value of the scheduling period parameter semiPersistSchedIntervalUL in the RRC configuration information is equal to 1. When semiPersistSchedIntervalUL=1, it is determined that multiple consecutive uplink subframes are scheduled.

Alternatively, the terminal determines whether to perform single-subframe scheduling or multi-subframe scheduling through indication information displayed in the DCI, for example, the value of 1 bit. For example, 0 represents single-subframe scheduling and 1 represents multi-subframe scheduling.

Alternatively, the terminal determines the uplink multi-subframe scheduling mode through semi-persistent configuration information in RRC high-level signaling of the base station. For example, multi-subframe scheduling is enabled when this information is notified, and single-subframe scheduling is enabled by default when this information is not notified.

Alternatively, the terminal determines the scheduling mode or transmission mode of multiple subframes in a predefined manner. If the terminal fails to send single-subframe scheduling data for k consecutive times and succeeds in LBT in the (k+1) time, the scheduling mode is considered by default to be multi-subframe consecutive transmission.

Alternatively, the terminal determines the uplink multi-subframe scheduling or transmission mode through a specific RNTI.

In step S306, Listen-Before-Talk (LBT) is performed according to the transmission mode.

Scheduling information of the subframe n is received according to a timing relationship, so LBT is performed before the subframe n+k or at the beginning of the n+k subframe. The value of k is related to the configuration of unlicensed uplink and downlink subframes.

In the data scheduling method provided by this embodiment of the present application, the terminal may be a user equipment such as a smart phone, a laptop, a tablet, a wearable device or a handheld business device, and the UE determines the implement manners of the LBT as follows:

Before data transmission, the UE receives occupation length information and subframe type (uplink subframe or downlink subframe) information of each subframe sent by the base station.

The UE determines, according to this information, the subframe index of the first scheduled transmission subframe in all uplink subframes.

In step S308, when the LBT is performed successfully according to the transmission mode, the uplink data is sent to the base station according to the scheduling information.

Specifically, on the basis of step S306, when LBT contention is successful or it is detected that UEs in the same cell have sent data on this carrier, the UE can send the prepared data according to the scheduling information.

Specifically, according to NDI information and HARQ process number information, the UE sends corresponding initially-transmitted packets or retransmitted packets.

Preferably, in a case where the UE transmits multiple consecutive subframes after the UE performs LBT successfully, the UE transmits data in subframes of the remaining scheduled subframes after LBT is successful.

Optionally, no matter in which scheduled subframe the UE performs LBT successfully, the UE transmits consecutive subframes in the scheduled burst length and transmits subsequent non-scheduled subframes by using the MU-MIMO mode.

Optionally, the UE may also determine the subframe pattern of uplink data transmission according to the contention result.

In the data transmission method provided by this embodiment of the present application, scheduling information sent by a base station is received, where the scheduling information is used for instructing a terminal to transmit uplink data on an unlicensed frequency spectrum; a transmission mode of the uplink data is determined; Listen-Before-Talk (LBT) is performed according to the transmission mode; and when the LBT is successfully performed, the uplink data is sent to the base station according to the scheduling information. This solves the problem of a reduced uplink data transmission efficiency due to a lack of a technology for reducing signaling overheads and improving an uplink transmission rate on an unlicensed frequency spectrum in the related art, thereby achieving effects of reducing the signaling overheads and improving the uplink transmission rate on the unlicensed frequency spectrum.

Further, the transmission mode of the uplink data is determined according to a preset condition. The preset condition includes at least one of the following: a format of downlink control information; display indication signaling in the downlink control information; a value of length indicator field of a transmitted or scheduled burst in the scheduling information; a value of an UL index in the scheduling information; Radio Resource Control (RRC) semi-persistent configuration signaling; a specific Cell Radio Network Temporary Identifier (C-RNTI); and a value of a uplink scheduling interval of a scheduling period parameter: (semiPersistSchedIntervalUL) in RRC configuration information being 1 and a Semi-Persistent-Scheduled Cell Radio Network Temporary Identifier (SPS-C-RNTI).

Specifically, when the UE performs LBT successfully according to the scheduling information and the parameter and type of the LBT before the first scheduled subframe is transmitted, the UE transmits m consecutive uplink subframes indicated by the length indicator field of the scheduled or transmitted burst in the scheduling indication or transmits consecutive subframes of a predefined length, for example, two uplink subframes or four uplink subframes. The corresponding frequency domain position is the frequency domain position in the scheduling configuration indication.

When the UE fails to perform LBT according to the n+k timing relationship before the first scheduled uplink subframe is transmitted and performs LBT successfully before the second scheduled subframe, the UE may continue to transmit m−1 consecutive subframes or may still transmit m subframes. The mth subframe is transmitted by using the MU-MIMO mode. If the UE fails to perform LBT in the first and the second scheduled subframes, the UE continues to perform LBT in the third scheduled subframe. After the UE performs LBT successfully in the third scheduled subframe, the UE transmits m−2 consecutive subframes or m consecutive subframes with the (m−1)th subframe and the mth subframe both being transmitted by using the MU-MIMO mode. The value of the cyclic shift of the pilot used in the MU transmission is obtained by the existing LTE technology. However, the difference between the last transmission subframe of the transmitted consecutive subframes and the first scheduled subframe cannot exceed a predefined threshold. For example, the maximum number of subframes that can be deferred for transmission by the UE is limited to 4.

For example, when the base station schedules a UE to transmit data in subframes 2, 3, 4 and 5, if the UE performs CCA successfully in the subframe 2, the UE can consecutively transmit subframes 2, 3, 4 and 5, that is, does not need to perform CCA in subsequent subframes. If the UE performs CCA unsuccessfully in the subframe 2 and performs CCA successfully in the subframe 3, the UE can consecutively transmit data in subframes 3, 4 and 5 without performing CCA. Alternatively, if the subframe 6 is still an uplink subframe, then the UE may transmit the scheduled data in subframes 3, 4, 5 and 6 and the UE needs to transmit data in the subframe 6 by using the MU mode.

Figures 4, 5:
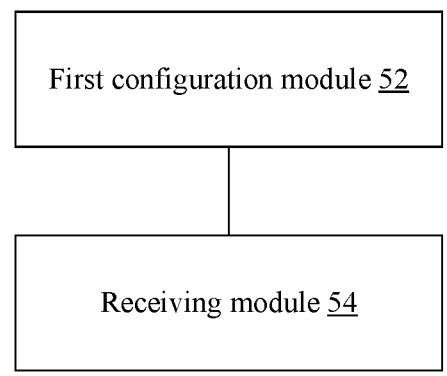
FIG. 4 is a schematic diagram illustrating that a UE determines a pattern of a final transmission subframe pattern according to an embodiment of the present disclosure.
FIG. 5 is a block diagram of a data scheduling apparatus according to an embodiment of the present disclosure.

In addition to transmitting uplink data in subframes configured by the base station, the UE may transmit uplink data according to preconfigured multiple subframe patterns. FIG. 4 is a schematic diagram illustrating that a UE determines a final transmission subframe pattern according to an embodiment of the present disclosure. As shown in FIG. 4, there are two types: consecutive and non-consecutive, and the UE determines the transmission subframe pattern according to the preemption result.

In this mode, the base station needs to provide the cyclic shift parameters of the pilot of multi-user MU-MIMO.

If the UE performs LBT successfully in the subframe 4, the UE can transmit data by using Pattern 2, that is, consecutively transmit subframes 4, 5, 6 and 7.

If the UE performs LBT unsuccessfully in the subframes 4 and 5, the UE competes the subframe 8 for transmission successfully according to the scheduling mode of Pattern 1, and then the UE needs to transmit data in subframes 8 and 9 by using the MU mode.

Further, the process of performing LBT according to the transmission mode in step S306 includes at least one of the following modes.

Mode 1: When the first scheduled transmission subframe is the first uplink subframe, a UE performs LBT on a full bandwidth; otherwise, the UE performs LBT at a scheduled sub-band level or a RB level, or directly performs enhanced energy detection on the last one or two symbols to detect cell-specific PUSCH RE muting or RE comb frequency domain resource reservation identifiers sent by other UEs.

Mode 2: The UE performs LBT on the full bandwidth in the first scheduled subframe and performs on a partial bandwidth at the scheduled sub-band level or the scheduled RB level in subsequent subframes.

Mode 3: The UE performs LBT on the full bandwidth in the first scheduled subframe, and performs LBT on a predefined pattern in the subsequent subframes.

Mode 4: After performing LBT successfully in the Kth scheduled subframe, the UE does not perform LBT in the subsequent subframes, and consecutively transmits data in m scheduled uplink subframes or remaining (m−k+1) scheduled subframes, where m denotes the number of scheduled subframes in an uplink data burst.

Mode 5: The UE performs LBT with back-off in the first scheduled subframe, and performs LBT without back-off or LBT with back-off values successively decreasing by one in the subsequent subframes.

Mode 6: When the UE transmits scheduled data in an UL subframe N and determines that the UE also needs to transmit the scheduled data in an UL subframe N+1, the UE does not perform CCA before the subframe N+1.

Specifically, with reference to the modes 1 to 6, the process of performing LBT according to the transmission mode by the terminal is as follows.

When the first scheduled transmission subframe is the first uplink subframe, the UE performs LBT on the full bandwidth; otherwise, the UE performs LBT at the scheduled sub-band level or the scheduled RB level, or directly performs enhanced energy detection on the last symbol to detect cell-specific PUSCH RE muting or RE comb frequency domain resource reservation identifiers sent by other UEs.

Alternatively, the UE performs LBT on the full bandwidth in the first scheduled subframe and performs LBT on the partial bandwidth at the scheduled sub-band level or the scheduled RB level in the subsequent subframes.

Alternatively, after the UE performs LBT successfully on the first scheduled subframe, the UE does not perform LBT in the subsequent subframe and directly transmits data on m scheduled consecutive uplink subframes and reserves RE resources of a predefined pattern on the last one or two OFDM symbols of each scheduled subframe.

Alternatively, the UE performs LBT with back-off in the first scheduled subframe, and performs LBT without back-off or LBT with back-off values successively decreasing by one in the subsequent subframe.

Alternatively, if the UE performs LBT successfully in the kth subframe, the UE sends data according to the scheduling indication information; and if there is still scheduled data to be sent in the (k+1)th subframe, the UE does not perform CCA in the (k+1)th subframe and directly uses an unlicensed carrier to send the scheduled data.

Further, the process of sending the uplink data to the base station according to the scheduling information in step S308 includes at least one of the following:

Mode 1: When only one combination of parameters is in the scheduling information, all scheduled subframes in the uplink data are transmitted according to the combination of parameters.

Mode 2: When multiple New Data Indicators (NDIs) and Hybrid Automatic Repeat reQuest (HARQ) process numbers are in the scheduling information, new data packets or retransmitted packets of the all scheduled subframes in the uplink data are transmitted according to the NDIs and the HARQ process numbers.

Mode 3: When multiple NDIs and one HARQ process number are in the scheduling information, the new data packets are transmitted according to the NDIs and the smallest one of corresponding HARQ process numbers and the retransmitted packets are transmitted according to an original HARQ process number.

Specifically, in combination with the modes 1, 2 and 3, the terminal sends the uplink data to the base station according to the scheduling information as follows.

The LBT parameter here includes a contention window size and/or a back-off value N. In particular, when the mode in which the UE performs LBT is to perform only one CCA slot each time, the UE only needs to determine the type of LBT, and does not need to determine the back-off value or the contention window size.

When one UL burst includes m data packets, the LBT level corresponding to the performed LBT's contention window and/or back-off value is determined as follows.

When data packets of the scheduled m consecutive subframes are all new data packets, the LBT contention window and/or back-off value is determined according to the LBT parameter corresponding to the lowest service level in the data packets.

When data packets of the scheduled m consecutive subframes are all retransmitted packets, the LBT contention window and/or back-off value is determined according to the LBT parameter corresponding to the highest service level in the data packets. Alternatively, when data packets of the scheduled m consecutive subframes are all retransmitted packets, the LBT contention window and/or back-off value is determined according to the LBT parameter corresponding to the lowest service level in the data packets.

When data packets of the scheduled m consecutive subframes include both new data packets and retransmitted packets, the LBT contention window and/or back-off value is determined according to the LBT parameter corresponding to the lowest service level in the data packets.

If the UE performs LBT successfully in the first scheduled subframe, the UE can consecutively transmit the scheduled m subframes. Optionally, the UE needs to reserve RE resources of a predefined frequency domain pattern on the last one or two OFDM symbols of each of the consecutively transmitted uplink subframes or reserve RE resources of a predefined frequency domain pattern on the first or first two OFDM symbols of each of the transmitted subframes.

Once the UE performs LBT successfully, the UE can consecutively transmit m subframes of the scheduled burst length or the remaining n (n is less than m) scheduled subframes at the scheduled resource positions.

Further, the data transmission method provided by this embodiment of the present application further includes at least one of the following:

Mode 1: When the UE fails to perform the LBT, the UE perform the LBT at a second Clear Channel Assessment (CCA) position of the uplink data until the last scheduled subframe in the uplink data.

Mode 2: When the UE fails to perform the LBT, the UE continues to perform LBT, and when a length (m−k) of the remaining uplink data is less than a threshold, transmission is abandoned, where m and k are positive integers and m is greater than k.

Mode 3: When the UE fails to perform the LBT, transmission is abandoned.

Here, in combination with the modes 1, 2 and 3, if LBT fails in the first scheduled subframe, then the UE continues to perform LBT in the position of the second CCA, and N of LBT is counted from the time when LBT ends at the last time and does not need to be regenerated. Alternatively, the value of N is a value that is obtained by reducing the LBT back-off value by a predefined value, for example, 1, and so on until the last scheduled subframe. Alternatively, the UE abandons the current multi-subframe-scheduling transmission when the remaining length of the burst is less than the threshold L Alternatively, the UE directly abandons transmission of this burst.

Specifically, if LBT fails in the first scheduled subframe, then the UE continues to perform LBT in the position of the next CCA, and if LBT with back-off is adopted, the back-off value N of the LBT is counted from the time when LBT ends at the last time and does not need to be regenerated; or the value of N is a value that is obtained by reducing the LBT back-off value by a predefined value, for example, 1, and so on until the last scheduled subframe, and if LBT still fails, the UE abandons transmission;

Alternatively, the UE abandons the current multi-subframe-scheduling transmission when the remaining length of the burst is less than the threshold L.

Alternatively, the UE directly abandons transmission of this burst if LBT fails in the first scheduled subframe.

Embodiment 3

From the description of the embodiments described above, it will be apparent to those skilled in the art that the method of any embodiment described above may be implemented by means of software plus a necessary general-purpose hardware platform, or may of course be implemented by hardware, but in many cases, the former is a preferred implementation mode. Based on this understanding, the solution provided by the present disclosure substantially, or the part contributing to the related art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

This embodiment provides a data scheduling apparatus for implementing the above embodiments and preferred examples. What has been described will not be repeated. As used below, the term "module" may be software, hardware or a combination thereof capable of implementing preset functions. The apparatuses in the embodiments described below are preferably implemented by software, but implementation by hardware or by a combination of software and hardware is also possible and conceived.

FIG. 5 is a block diagram of a data scheduling apparatus according to an embodiment of the present disclosure. As shown in FIG. 5, at a base station, the apparatus includes: a first configuration module 52 and a receiving module 54.

The first configuration module 52 is configured to configure scheduling information according to a predetermined scheduling mode of unlicensed uplink subframes. The scheduling information is used for instructing a terminal to transmit uplink data on an unlicensed frequency spectrum.

The receiving module 54 is configured to receive, according to the scheduling information configured by the first configuration module 52, the uplink data sent by the terminal.

In the data scheduling apparatus provided by this embodiment of the present application, scheduling information is configured according to a predetermined scheduling mode of the unlicensed uplink subframes, where the scheduling information is used for instructing a terminal to transmit uplink data on an unlicensed frequency spectrum; and the uplink data sent by the terminal is received according to the scheduling information. This solves the problem of a reduced uplink data transmission efficiency due to a lack of a technology for reducing signaling overheads and improving an uplink transmission rate on an unlicensed frequency spectrum in the related art, thereby achieving effects of reducing the signaling overheads and improving the uplink transmission rate on the unlicensed frequency spectrum.

Figure 6:
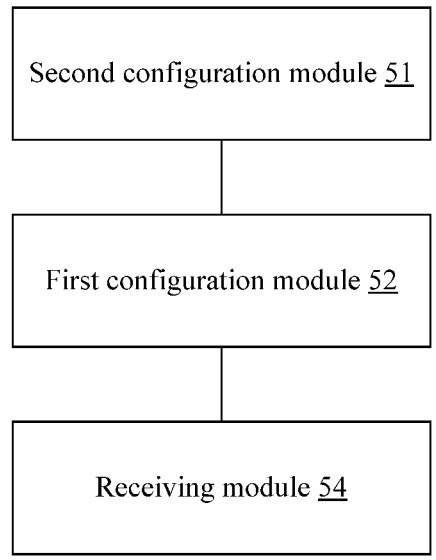
FIG. 6 is a block diagram of another data scheduling apparatus according to an embodiment of the present disclosure.

Further, FIG. 6 is a block diagram of another data scheduling apparatus according to an embodiment of the present disclosure. As shown in FIG. 6, the data scheduling apparatus provided by this embodiment of the present application further includes: a second configuration module 51.

The second configuration module 51 is configured to, before the scheduling information is configured according to the predetermined scheduling mode of the unlicensed uplink subframes, determine the scheduling mode according to a preset condition. The preset condition includes one of the following: a ratio of a downlink load to an uplink load of an unlicensed carrier is lower than a predefined threshold; the number of downlink subframes is less than the number of uplink subframes in one Transmit Opportunity (TXOP); and the uplink data consecutively fails to be received for k times within a predetermined period of time T, where k is an integer.

Further, the scheduling mode includes: scheduling at least one uplink data burst of the terminal each time, and each of the at least one uplink data burst includes m consecutive uplink subframes, where m is a positive integer greater than or equal to 1.

Further, the scheduling information includes: public scheduling information common to all scheduled subframes in an uplink data burst and private scheduling information of each of the all scheduled subframes in the uplink data burst, and the private scheduling information includes at least one of the following: a Listen-Before-Talk (LBT) type, a New Data Indicator (NDI), a Redundancy Version (RV) and a Hybrid Automatic Repeat reQuest (HARQ) process number.

Further, the first configuration module 52 includes at least one of the following: a first configuration unit, a second configuration unit, and a third configuration unit.

The first configuration unit is configured to, when the all scheduled subframes in the scheduled uplink data burst carry new data packets, configure the scheduling information to include a combination of scheduling parameters. The combination of scheduling parameters includes: the NDI, the RV and the HARQ process number.

The second configuration unit is configured to, when the all scheduled subframes in the scheduled uplink data burst carry retransmitted packets and initially-transmitted packets corresponding to the retransmitted packets share the combination of scheduling parameters, configure the scheduling information to include the combination of scheduling parameters. The combination of scheduling parameters includes: the NDI, the RV and the HARQ process number.

The third configuration unit is configured to, when the all scheduled subframes in the scheduled uplink data burst carry the new data packets and the retransmitted packets, allocate multiple combinations of scheduling parameters to the new data packets and the retransmitted packets, where the multiple combinations of scheduling parameters include: the NDI, the RV and the HARQ process number.

Further, the third configuration unit includes one of the following:

a first configuration subunit, which is configured to allocate the combination of scheduling parameters to the new data packets and the retransmitted packets separately, where the combination of scheduling parameters includes: the NDI, the RV and the HARQ process number; and a second configuration subunit, which is configured to allocate the combination of scheduling parameters to each data packet.

Further, the first configuration module 52 includes:

a fourth configuration unit, which is configured to, when new data packets in the scheduled uplink data burst are erroneously received, configure scheduling information of the retransmitted data packet at next time, where the fourth configuration unit includes one of the following:

a third configuration subunit, which is configured to schedule each of the retransmitted packets separately;

a fourth configuration subunit, which is configured to allocate the combination of scheduling parameters to the each of the retransmitted packets separately, where the combination of scheduling parameters includes: the NDI, the RV and the HARQ process number; and a fifth configuration subunit, which is configured to schedule a same combination of scheduling parameters for the retransmitted packets.

Figure 7:
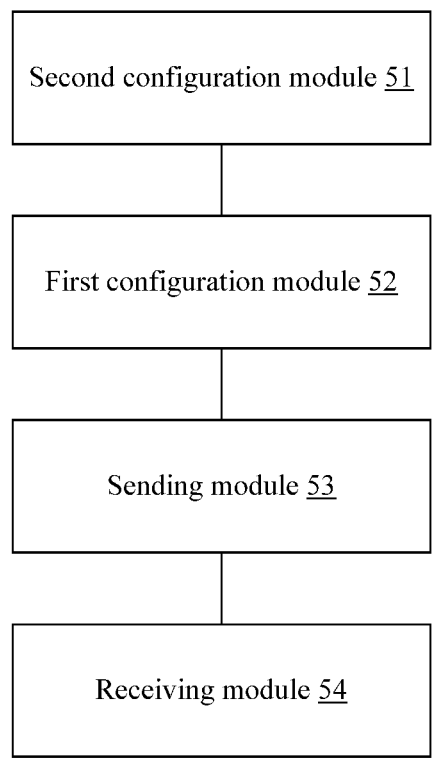
FIG. 7 is a block diagram of yet another data scheduling apparatus according to an embodiment of the present disclosure.

Further, FIG. 7 is a block diagram of another data scheduling apparatus according to an embodiment of the present disclosure. As shown in FIG. 7, the data scheduling apparatus provided by this embodiment of the present application further includes: a sending module 53.

The sending module 53 is configured to send the scheduling information to the terminal before the uplink data sent by the terminal is received according to the scheduling information. The sending module 53 includes at least one of the following:

a first sending unit, which is configured to carry and send the public scheduling information in the scheduling information through a downlink control channel; and a second sending unit, which is configured to carry and send through a downlink data channel at least one of the following: the private scheduling information, an LBT type, an LBT contention window, an LBT back-off indicator value, and a scheduled or transmitted burst length indicator which are in the scheduling information.

Further, the sending module 53 further includes at least one of the following:

a third sending unit, which is configured to send the scheduling information to the terminal, where the scheduling information is carried by control information corresponding to an existing control information format; and a fourth sending unit, which is configured to send the scheduling information to the terminal, where the scheduling information is carried by control information corresponding to a configured control information format or transmission mode or is carried by control information scrambled by a specific RNTI.

Further, the receiving module 54 includes at least one of the following:

a first feedback unit, which is configured to feed back a New Data Indicator (NDI) and/or a response message in a unified way for same data packets in same uplink data; and a second feedback unit, which is configured to feed back the NDI and/or the response message separately for different data packets in the same uplink data, where the response message includes: ACK or NACK.

Further, the scheduling information further includes at least one of the following: the LBT type, an LBT contention window, an LBT back-off indicator value, a carrier indicator, a resource block indicator, a modulation and coding level, the HARQ process number, a scheduled or transmitted burst length indicator, and an uplink index.

Further, the LBT type includes: a full bandwidth energy detection, performing LBT on a partial bandwidth of a sub-band where a scheduled Physical Resource Block (PRB) is located or performing LBT on a partial bandwidth of the scheduled PRB, a predefined pattern detection, not performing LBT, performing LBT for only once, or performing LBT with back-off for multiple times.

Further, instructing not performing LBT includes one of the following: when data of a UE in last scheduling is received in a subframe N and it is found that the UE needs to schedule or transmit data in an uplink subframe N+1, instructing not performing LBT before the data is sent in the subframe N+1; when scheduled data of another UE is received in the subframe N and it is found that the UE needs to be scheduled in the uplink subframe N+1, instructing the UE not to perform LBT before sending the data in the subframe N+1; and when downlink data is sent in the subframe N and it is found that the UE needs to be scheduled in the uplink subframe N+1, instructing not performing LBT before the data is sent in the subframe N+1.

Further, the first configuration module 52 is further configured to instruct the LBT type. The LBT type includes one of the following: when a first scheduled subframe is a first uplink subframe, instructing performing LBT on the full bandwidth; when the first scheduled subframe is not the first uplink subframe, instructing performing LBT at a scheduled sub-band level or a RB level or performing LBT on the predefined pattern detection, where the LBT type of the predefined pattern detection includes: performing enhanced energy detection on last one or two symbols, detecting a cell-specific PUSCH RE muting pattern sent by another UE, or detecting sounding reference signal (SRS) comb frequency domain resource reservation pattern identifier.

Further, the sending module 53 is further configured to carry the scheduling information through the downlink data channel by using one of the following modes: carrying the scheduling information at DCI format 0 or 4 or at a predefined frequency domain position of a downlink data channel of a subframe where the public scheduling information of the scheduled subframes is located, and a Modulation and Coding Scheme (MCS) being a predefined value; carrying the scheduling information at DCI format 0 or 4 or at a frequency domain position of RRC message configuration of the downlink data channel of the subframe where the public scheduling information of the scheduled subframes is located; and carrying the scheduling information at DCI format 0 or 4 or at a frequency domain position of a downlink data channel indicated by a downlink control channel of the subframe where the public scheduling information of the scheduled subframes is located.

Embodiment 4

Figure 8:
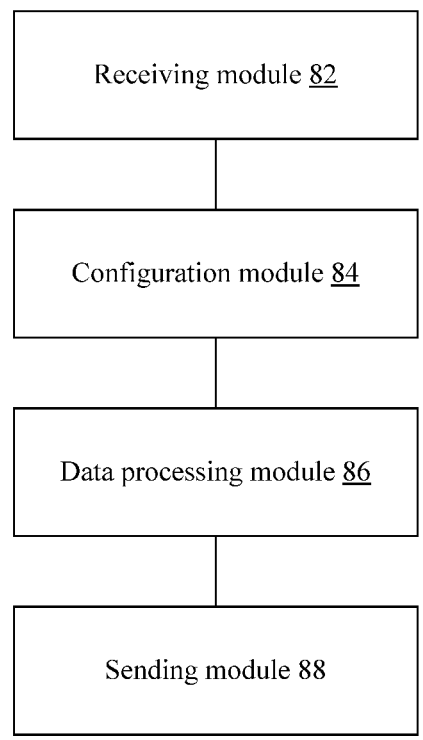
FIG. 8 is a block diagram of a data transmitting apparatus according to another embodiment of the present disclosure.

FIG. 8 is a block diagram of a data scheduling apparatus according to another embodiment of the present disclosure. As shown in FIG. 8, at a terminal, the apparatus includes: a receiving module 82, a configuration module 84, a data processing module 86 and a sending module 88.

The receiving module 82 is configured to receive scheduling information sent by a base station, where the scheduling information is used for instructing a terminal to transmit uplink data on an unlicensed frequency spectrum.

The configuration module 84 is configured to determine a transmission mode of the uplink data.

The data processing module 86 is configured to perform Listen-Before-Talk (LBT) according to the transmission mode determined by the configuration module.

The sending module 88 is configured to, when the LBT is performed successfully, send the uplink data to the base station according to the scheduling information received by the receiving module 82.

The data transmission apparatus provided by this embodiment of the present disclosure receives scheduling information sent by a base station, where the scheduling information is used for instructing a terminal to transmit uplink data on an unlicensed frequency spectrum; determines a transmission mode of the uplink data; performs Listen-Before-Talk (LBT) according to the transmission mode; and when the LBT is performed successfully, sends the uplink data to the base station according to the scheduling information. This solves the problem of a reduced uplink data transmission efficiency due to a lack of a technology for reducing signaling overheads and improving an uplink transmission rate on an unlicensed frequency spectrum in the related art, thereby achieving effects of reducing the signaling overheads and improving the uplink transmission rate on the unlicensed frequency spectrum.

Further, the configuration module 84 includes:
a configuration unit, which is configured to determine the transmission mode of the uplink data according to a preset condition, where the preset condition includes one of the following: a format of Downlink Control Information; display indication signaling in the Downlink Control Information; a value of a transmitted or scheduled burst length indicator field in the scheduling information; a value of an UL index in the scheduling information; by Radio Resource Control (RRC) semi-persistent configuration signaling; by a specific Cell Radio Network Temporary Identifier (C-RNTI); and by a Semi-Persistent-Scheduled Cell Radio Network Temporary Identifier (SPS-C-RNTI), and a value of uplink scheduling interval (semiPersistSchedIntervalUL) being 1 which is a scheduling period parameter in RRC configuration information.

Further, the data processing module 86 includes at least one of the following:
a first data processing unit, which is configured to, when a first scheduled transmission subframe is a first uplink subframe, perform LBT on a full bandwidth; when the first scheduled transmission subframe is not the first uplink subframe, perform LBT at a scheduled sub-band level or a RB level; or a second data processing unit, which is configured to perform LBT on the full bandwidth in the first scheduled subframe, and perform LBT on a partial bandwidth at the scheduled sub-band level or the scheduled RB level in a subsequent subframe;

a third data processing unit, which is configured to perform LBT on the full bandwidth in the first scheduled subframe, and perform LBT on a predefined pattern detection in the subsequent subframe;

a fourth data processing unit, which is configured to, after LBT is performed successfully in a Kth scheduled subframe, not perform LBT in the subsequent subframe, and consecutively transmit m scheduled uplink subframes or remaining (m−k+1) scheduled subframes, where m denotes a number of scheduled subframes in an uplink data burst;

a fifth data processing unit, which is configured to perform LBT with back-off in the first scheduled subframe, and perform LBT without back-off or LBT with back-off values successively decreasing by one in the subsequent subframes; and a sixth data processing unit, which is configured to, when the terminal sends scheduled data in an UL subframe N and determines that the terminal also needs to send the scheduled data in an UL subframe N+1, not perform CCA before the subframe N+1.

Further, the sending module 88 includes at least one of the following:
a first sending unit, which is configured to, when only one combination of parameters is in the scheduling information, transmit all scheduled subframes in the uplink data according to the parameter combination;

a second sending unit, which is configured to, when multiple New Data Indicators (NDIs) and Hybrid Automatic Repeat Request (HARQ) process numbers are in the scheduling information, transmit new data packets or retransmitted packets of the all scheduled subframes in the uplink data according to the NDIs and the HARQ process numbers; and a third sending unit, which is configured to, when multiple NDIs and one HARQ process number are in the scheduling information, transmit the new data packets according to the NDIs and a smallest one of corresponding HARQ process numbers and transmit the retransmitted packets according to an original HARQ process number.

Further, the data transmission apparatus provided by this embodiment of the present disclosure further includes at least one of the following:
a first performing unit, which is configured to, when the LBT is failed, perform LBT at a second Clear Channel Assessment (CCA) position of the uplink data until a last scheduled subframe in the uplink data;

a second performing unit, which is configured to, when the LBT is failed, continue to perform LBT, and when a length (m−k) of the remaining uplink data is less than a threshold, abandon transmission, where m and k are positive integers and m is greater than k; and a third performing unit, which is configured to, when the LBT is failed, abandon transmission.

Embodiment 5

Figure 9:
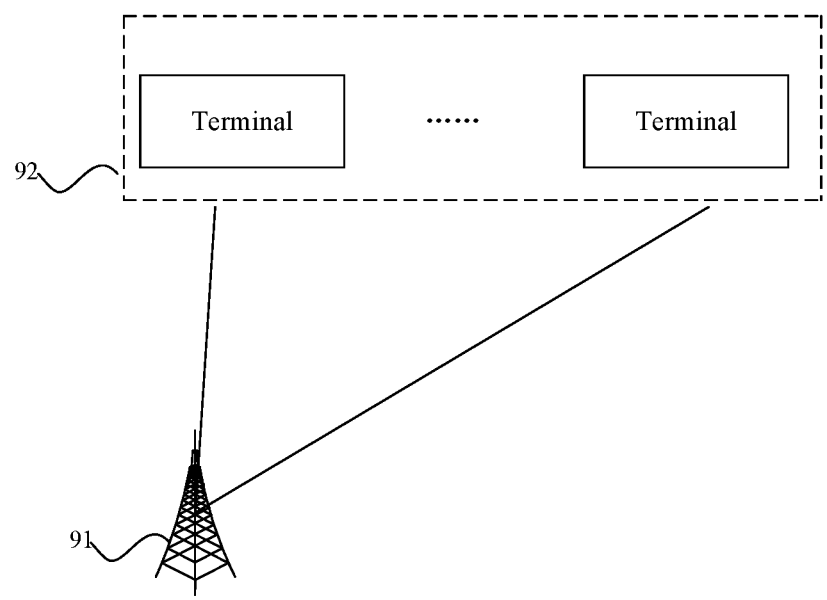
FIG. 9 is a block diagram of a data scheduling and transmitting system according to yet another embodiment of the present disclosure.

FIG. 9 is a block diagram of a data scheduling and transmission system according to another embodiment of the present disclosure. As shown in FIG. 9, the system includes: a base station 91 and terminals 92. The base station 91 is in communication connection with the terminals 92. The base station 91 is the data scheduling apparatus shown in any one of FIGS. 5 to 7; and the terminal 92 is the data transmission apparatus shown in FIG. 8.

It is to be noted that although the base station is used as an example to describe this embodiment of the present disclosure, the method is also applicable to nodes at the same level as the base station, such as a relay station and an access point.

Specifically, in this embodiment of the present disclosure, a case where one uplink transmitted burst including multiple consecutive uplink subframes is scheduled through existing Semi-Persistent Scheduling (SPS) on the basis of one downlink subframe is detailed as follows:

First, the base station configures the scheduling period parameter semiPersistSchedIntervalUL=1 ms in the SPS through Radio Resource Control (RRC) signaling, and sends downlink control information (DCI) of uplink scheduling.

Then, after receiving the SPS configuration information and the SPS scheduling indication information, the terminal first performs LBT and, after the LBT is performed successfully, performs data transmission of each subframe according to the DCI.

Moreover, the base station determines the release of the SPS scheduling mode by the burst length indication information provided in the DCI. Before the time of the released subframe, the terminal can continue to transmit CSI reporting information or BSR information on carriers acquired by contention.

Alternatively, the base station sends a new DCI on a licensed carrier to show the release of the previous SPS scheduling. This DCI indicates a new resource block location or MCS level modification.

Figure 10:
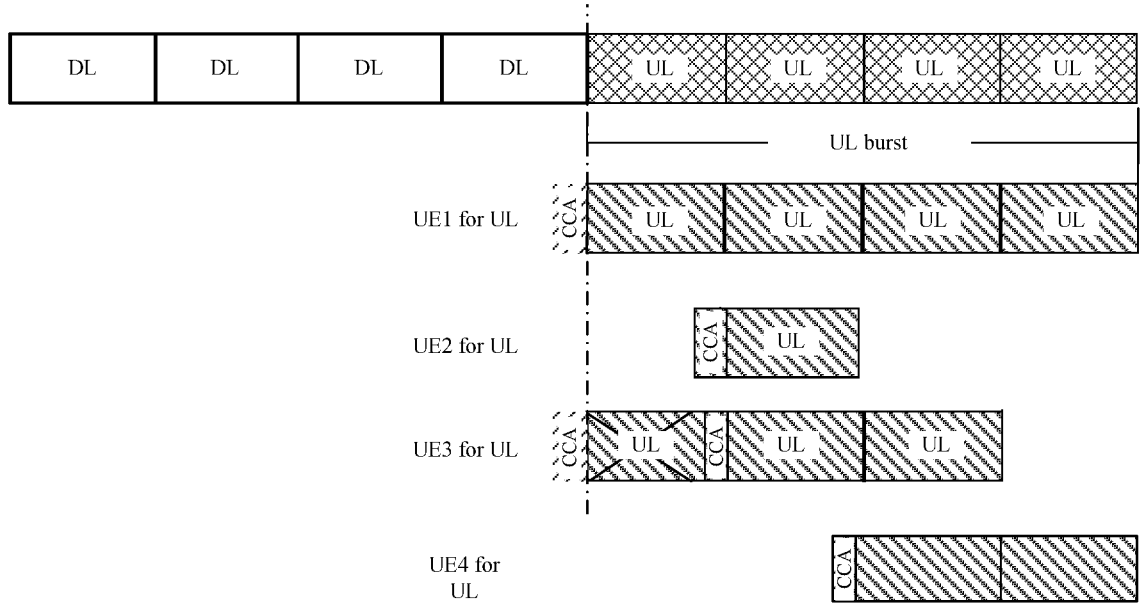
FIG. 10 is a schematic diagram of multi-user multiplexing in a data scheduling and transmitting method according to an embodiment of the present disclosure.

In addition, FIG. 10 is a schematic diagram of multi-user multiplexing in a data scheduling and transmission method according to an embodiment of the present disclosure. As shown in FIG. 10, a method for implementing multi-user multiplexing of other scheduled UEs in a case where multiple consecutive subframes are transmitted is described as below.

Multiple LBT types may be defined to achieve uplink multi-user multiplexing, such that the consecutive transmission of the UE does not affect the data transmission of other UEs which are scheduled in the same subframe and perform LBT successfully. Specifically, the LBT type includes: full-bandwidth energy detection, partial-bandwidth energy detection and RE resource reservation pattern detection.

The method for determining the LBT type is as follows:

The base station provides the types of the uplink and downlink subframes in the public search space of the downlink subframes or other indication signaling. The UE determines the subframe index of each subframe in the scheduled burst according to this information, and then the UE determines the LBT type or parameter according to the subframe index of each scheduled subframe.

For example, as shown in FIG. 3, the base station notifies the UE of the sequence and indexes of the uplink and downlink subframes through DCI signaling.

For UEs scheduled in the first uplink subframe (as shown in the figure, UE1 which schedules four consecutive subframes and UE3 which schedules three consecutive subframes), full-bandwidth regular LBT is performed before burst transmission. After the UE1 performs LBT successfully, the UE1 transmits four consecutive subframes at the scheduled resource location. If the UE3 does not succeed in performing LBT in the first uplink subframe, the UE3 continues to perform LBT on a scheduled PRB or sub-band in the second scheduled subframe. After the UE3 performs LBT successfully, the UE3 transmits the scheduled remaining two consecutive subframes on the scheduled PRB.

If the first subframe of the burst where the UE is scheduled is not the first uplink subframe (like UE2 and UE4 in the figure), then the UE directly performs CCA on the scheduled sub-band/RB according to the frequency domain resource allocation information in the DCI. After CCA is performed successfully, data can be transmitted in the scheduled subframes.

Alternatively, the two UEs may also perform LBT on a full bandwidth in the first scheduled subframe and perform LBT on the scheduled PRB or sub-band in the remaining scheduled subframes.

Through this mode, in a case where a UE transmits multiple consecutive subframes, the UE does not affect successful implementation of LBT of other UEs in the same subframes, thereby achieving multi-user multiplexing.

Figure 11:
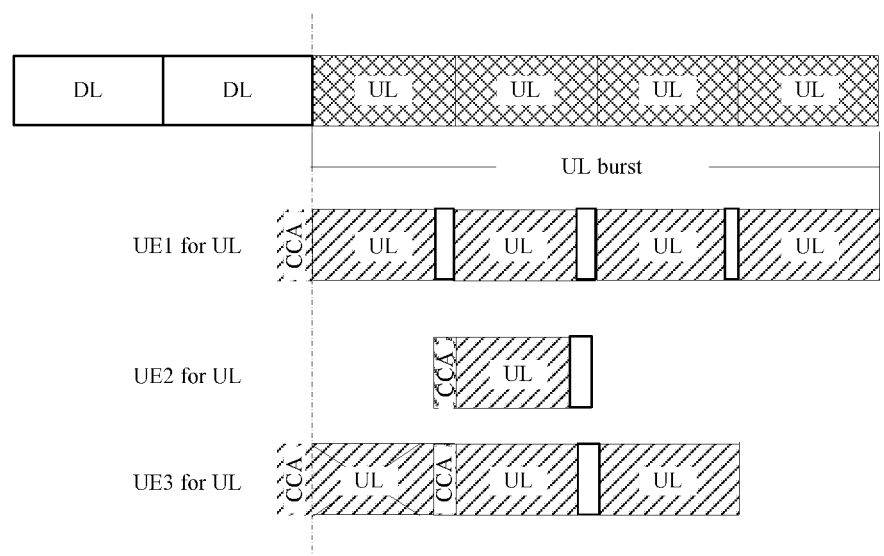
FIG. 11 is a schematic diagram of multi-user multiplexing in a data scheduling and transmitting method according to an embodiment of the present disclosure.

Optionally, FIG. 11 is a schematic diagram of multi-user multiplexing in a data scheduling and transmission method according to an embodiment of the present disclosure. As shown in FIG. 11, a method for implementing multi-user multiplexing in multiple consecutive uplink subframes transmission is described as below.

To make a UE that transmits consecutive subframes not affect successful implementation of LBT and data transmission of other UEs and achieve multi-user multiplexing, the UE may reserve RE resources of a predefined frequency domain pattern on the last one or two OFDM symbols of each of the consecutively transmitted uplink subframes or may reserve RE resources of a predefined frequency domain pattern on the first or first two OFDM symbols of each of the transmitted subframes.

The method for determining the type of the LBT performed by the UE is as follows:

The base station gives the types of the uplink and downlink subframes in the public search space of the downlink subframes. The UE determines the subframe index of each subframe in the scheduled burst according to this information, and then the UE determines the LBT type according to the subframe index of each scheduled subframe.

For example, as shown in FIG. 4, the base station notifies the UE of the sequence and indexes of the uplink and downlink subframes through DCI signaling.

Then, in the first downlink subframe, the base station sends DCI information to schedule UE1 to transmit data in the subframes 1, 2, 3 and 4 of the uplink subframes and to schedule UE3 to transmit data in the uplink subframes 1, 2 and 3. In the second downlink subframe, the base station schedules UE2 to transmit data only in the uplink subframe 2.

After receiving downlink control information, a UE scheduled in the first uplink subframe (like UE1 and UE3 in the figure) performs full-bandwidth regular LBT before the first uplink subframe. UE1 transmits 4 consecutive subframes after the UE1 performs the LBT successfully. At the same time, RE resources with the full bandwidth predefined pattern or a scheduled RB are reserved on the last one or two OFDM symbols of each of the four consecutive transmission subframes. UE3 does not perform LBT on a full bandwidth successfully in the first scheduled subframe and, like UE2, performs enhanced energy detection on the second uplink subframe to detect cell-specific PUSCH RE muting or RE comb frequency domain resource reservation identifier sent by other UE1. After detecting this identifier or pattern, UE3 can transmit data on the second uplink data to achieve multi-user multiplexing.

The data scheduling and transmission system provided by embodiments of the present application provides a scheduling and transmitting method on uplink subframes of an unlicensed spectrum. The method solves the resource contention problem in uplink data transmission on an unlicensed carrier in LTE, improves the probability that a terminal performs LBT successfully in scheduling of the terminal, ultimately increases the transmitting probability of scheduled uplink data, reduces the delay of uplink transmission, and alleviates the problem of wasting control signaling corresponding to the UL grant and allocated resources due to the terminal's failing in LBT.

It should be noted that the various modules described above may be implemented by software or hardware. Implementation by hardware may, but may not necessarily, be performed by the following method: the various modules described above are located in a same processor or are located multiple processors respectively.

Embodiments of the present disclosure further provide a storage medium. Optionally, in this embodiment, the storage medium may be configured to store program codes for executing the steps described below.

In step S1, scheduling information is configured according to a predetermined scheduling mode of unlicensed uplink subframes, where the scheduling information is used for instructing a terminal to transmit uplink data on an unlicensed frequency spectrum.

In step S2, the uplink data sent by the terminal is received according to the scheduling information.

Optionally, the storage medium is further configured to store program codes for executing the steps described below.

In step S1, the scheduling mode is determined according to a preset condition. The preset condition includes at least one of the following: a downlink load of an unlicensed carrier is lower than an uplink load of the unlicensed carrier; the number of downlink subframes is less than the number of uplink subframes in one Transmit Opportunity (TXOP); and the uplink data consecutively fails to be received for k times within a predetermined period of time T, where k is an integer.

Optionally, in this embodiment, the storage medium may include, but are not limited to, a U disk, a read-only memory (ROM), a random access memory (RAM), a mobile hard disk, a magnetic disk, an optical disk or another medium capable of storing program codes.

Optionally, in this embodiment, the scheduling mode determined by the processor according to the preset condition on the basis of the program codes that have been stored in the storage medium includes: scheduling at least one uplink data burst of the terminal each time. Each of the at least one uplink data burst includes m consecutive uplink subframes, where m is a positive integer greater than or equal to 1.

Optionally, in this embodiment, the process of configuring by the processor the scheduling information according to the predetermined scheduling mode of the unlicensed uplink subframes according to the program codes that have been stored in the storage medium includes at least one of the following: when each scheduled subframe in the scheduled uplink data burst carry new data packets, the scheduling information including a combination of scheduling parameters, which includes: an NDI, an RV and an HARQ process number; when the all scheduled subframes in the scheduled uplink data burst carry retransmitted packets and initially-transmitted packets corresponding to the retransmitted packets share one combination of scheduling parameters, the scheduling information including the one combination of scheduling parameters, which includes: the NDI, the RV and the HARQ process number; and when the all scheduled subframes in the scheduled uplink data burst carry the new data packets and the retransmitted packets, allocating multiple combinations of scheduling parameters to the new data packets and the retransmitted packets, where the multiple combinations scheduling parameters include: the NDI, the RV and the HARQ process number.

Optionally, in this embodiment, the process of allocating by the processor multiple combinations of scheduling parameters to the new data packets and the retransmitted packets according to the program codes that have been stored in the storage medium includes at least one of the following: allocating the combination of scheduling parameters to the new data packets and the retransmitted packets separately, where the combination of scheduling parameters includes: the NDI, the RV and the HARQ process number; and allocating the combination of scheduling parameters to each packet.

Optionally, in this embodiment, the process of configuring, by the processor, the scheduling information according to the predetermined scheduling mode of unlicensed uplink subframes according to the program codes that have been stored in the storage medium includes: when the all scheduled subframes in the scheduled one uplink data burst carry retransmitted packets, configuring the scheduling information to include at least one of the following: scheduling each of the retransmitted packets separately; allocating the combination of scheduling parameters to the each of the retransmitted packets separately, and scheduling a same combination of scheduling parameters for the retransmitted packet. The combination of scheduling parameters includes: the NDI, the RV and the HARQ process number.

Optionally, in this embodiment, before the processor receives the uplink data from the terminal according to the scheduling information according to the program codes that have been stored in the storage medium, the method further includes: sending the scheduling information to the terminal. The sending the scheduling information to the terminal includes at least one of the following: carrying and sending the public scheduling information in the scheduling information through a Downward Control Information (DCI) format, and carrying and sending private scheduling information in the scheduling information through a downlink data channel.

Optionally, in this embodiment, the process of sending, by the processor, the scheduling information to the terminal according to the program codes that have been stored in the storage medium further includes at least one of the following: sending the scheduling information to the terminal, where the scheduling information is carried by control information corresponding to an existing control information format; and sending the scheduling information to the terminal, where the scheduling information is carried by control information corresponding to a configured control information format or transmission mode.

Optionally, in this embodiment, the process of receiving, by the processor, the uplink data from the terminal based on the scheduling information according to the program codes that have been stored in the storage medium includes at least one of the following: for same data packets in same uplink data, feeding back a New Data Indicator (NDI) and/or a response message in a unified way; and for different data packets in the same uplink data, feeding back the NDI and/or the response message separately, where the response message includes: ACK or NACK.

Optionally, for specific examples in this embodiment, reference may be made to the examples described in the above embodiments and optional implementation modes, and the specific examples will not be repeated in this embodiment.

Apparently, those skilled in the art should know that the above-mentioned various modules or steps of the present disclosure may be implemented by a universal computing device, the various modules or steps may be concentrated on a single computing device or distributed in a network formed by multiple computing devices, and alternatively, the various modules or steps may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

What is claimed is:

1. A data scheduling method, comprising:
   configuring scheduling information according to a predetermined scheduling mode of unlicensed uplink subframes, wherein the scheduling information is configured to instruct a terminal to transmit uplink data on an unlicensed frequency spectrum; and
   receiving the uplink data sent by the terminal according to the scheduling information,
   wherein the method is performed by a base station;
   wherein the scheduling information comprises: public scheduling information common to all scheduled subframes in one uplink data burst and private scheduling information of each of the all scheduled subframes in the one uplink data burst, wherein the private scheduling information comprises at least one of: a Listen-Before-Talk (LBT) type, a New Data Indicator (NDI), a Redundancy Version (RV) or a Hybrid Automatic Repeat Request (HARQ) process number.

2. The method of claim 1, before configuring the scheduling information according to the predetermined scheduling mode of the unlicensed uplink subframes, the method further comprising: determining the scheduling mode according to a preset condition, wherein the preset condition comprises at least one of: a ratio of a downlink load to an uplink load of an unlicensed carrier is lower than a predefined threshold; a number of downlink subframes is less than a number of uplink subframes in one Transmission Opportunity (TXOP); or the uplink data consecutively fails to be received for k times on an unlicensed frequency spectrum within a predetermined period of time T, wherein k is an integer.

3. The method of claim 2, wherein the scheduling mode comprises: scheduling at least one uplink data burst of the terminal each scheduling instance, wherein each of the at least one uplink data burst comprises m consecutive uplink subframes, wherein m is a positive integer greater than or equal to 1.

4. The method of claim 1, wherein configuring the scheduling information according to the predetermined scheduling mode of the unlicensed uplink subframes comprises at least one of:
   in response to determining that each subframe in the one uplink data burst is scheduled to carry a new data packet, the scheduling information comprising a combination of scheduling parameters, wherein the combination of scheduling parameters comprises: the NDI, the RV and the HARQ process number;
   in response to determining that all subframes in the one uplink data burst are scheduled to carry retransmitted data packets and initially-transmitted data packets corresponding to the retransmitted data packets share a combination of scheduling parameters, the scheduling information comprising the combination of scheduling parameters, wherein the combination of scheduling parameters comprises: the NDI, the RV and the HARQ process number; or
   in response to determining that the one uplink data burst is scheduled to carry new data packets and retransmitted data packets, allocating multiple combinations of scheduling parameters to the new data packets and the retransmitted data packets, wherein the combinations of scheduling parameters comprise: the NDI, the RV and the HARQ process number.

5. The method of claim 4, wherein the allocating multiple combinations of scheduling parameters to the new data packets and the retransmitted data packets comprises at least one of:
   allocating one of the combinations of scheduling parameters to the new data packet and allocating one of the combinations of scheduling parameters to the retransmitted data packet, wherein the one of the combinations of scheduling parameters comprises: the NDI, the RV and the HARQ process number; or
   allocating a respective one of the combinations of scheduling parameters to each one of the new data packets and the retransmitted data packets.

6. The method of claim 1, before receiving the uplink data sent by the terminal according to the scheduling information, the method further comprising: sending the scheduling information to the terminal,
   wherein sending the scheduling information to the terminal comprises at least one of:
   carrying and sending the public scheduling information in the scheduling information through a downlink control channel; or carrying and sending, through a downlink data channel, at least one of: the private scheduling information, an LBT type, an LBT contention window, an LBT back-off indicator value, or a scheduled or transmitted burst length indicator, which are in the scheduling information.

7. The method of claim 6, wherein sending the scheduling information to the terminal further comprises at least one of:
carrying the scheduling information through control information corresponding to existing control information format and sending the scheduling information to the terminal through the control information corresponding to existing control information format; or
carrying the scheduling information through control information scrambled by a specific Radio Network Temporary Identity (RNTI) or control information corresponding to a configured control information format or transmission mode, and sending the scheduling information to the terminal through the control information scrambled by the specific RNTI or the control information corresponding to the configured control information format or transmission mode.

8. The method of claim 1, wherein scheduling information further comprises at least one of: the LBT type, an LBT contention window, an LBT back-off indicator value, a carrier indicator, a resource block indicator, a modulation and coding level, the HARQ process number, a scheduled or transmitted burst length indicator, or an uplink index.

9. The method of claim 8, wherein the LBT type comprises: a full bandwidth energy detection, LBT on a partial bandwidth of a sub-band to which a scheduled Physical Resource Block (PRB) belongs or LBT on a partial bandwidth of the scheduled PRB, a predefined pattern detection, not performing LBT, performing LBT for only once, or LBT of multiple detection with back-off.

10. The method of claim 9, wherein not performing LBT comprises at least one of:
in response to determining that last scheduled data of a UE is received in a subframe N and determining that the UE needs to schedule or transmit data in an uplink subframe N+1, instructing not performing LBT before the data is sent in the subframe N+1;
in response to determining that scheduled data of another UE is received in the subframe N and determining that the UE needs to be scheduled in the uplink subframe N+1, instructing the UE not to perform LBT before sending the data in the subframe N+1; or
in response to determining that downlink data is sent in the subframe N and determining that the UE needs to be scheduled in the uplink subframe N+1, instructing not performing LBT before the data is sent in the subframe N+1.

11. The method of claim 9, wherein instructing the LBT type comprises:
in response to determining that a first scheduled subframe is a first uplink subframe, instructing performing LBT on the full bandwidth; in response to determining that the first scheduled subframe is not the first uplink subframe, instructing performing LBT at a scheduled sub-band level or a scheduled RB level or performing LBT on the predefined pattern detection,
wherein an LBT type of the predefined pattern detection comprises: performing enhanced energy detection on last one or two symbols, detecting a cell-specific PUSCH RE muting pattern sent by another UE, or detecting sounding reference signal (SRS) comb frequency domain resource reservation pattern identifier.

12. The method of claim 6, wherein carrying the scheduling information through the downlink data channel comprises at least one of:
carrying the scheduling information at DCI format 0 or 4 or at a predefined frequency domain position of a downlink data channel of a subframe where the public scheduling information of the scheduled subframes is located, and a Modulation and Coding Scheme (MCS) being a predefined value;
carrying the scheduling information at DCI format 0 or 4 or at a frequency domain position of RRC message configuration of the downlink data channel of the subframe where the public scheduling information of the scheduled subframes is located; or
carrying the scheduling information at DCI format 0 or 4 or at a frequency domain position of a downlink data channel indicated by a downlink control channel of the subframe where the public scheduling information of the scheduled subframes is located.

13. A data transmission method, comprising:
receiving scheduling information sent by a base station, wherein the scheduling information is configured to instruct a terminal to transmit uplink data on an unlicensed frequency spectrum;
determining a transmission mode of the uplink data;
performing Listen-Before-Talk (LBT) according to the transmission mode; and
in response to determining that the LBT is successful performed, sending the uplink data to the base station according to the scheduling information,
wherein the method is performed by a terminal;
wherein the scheduling information comprises: public scheduling information common to all scheduled subframes in one uplink data burst and private scheduling information of each of the all scheduled subframes in the one uplink data burst, wherein the private scheduling information comprises at least one of: a Listen-Before-Talk (LBT) type, a New Data Indicator (NDI), a Redundancy Version (RV) or a Hybrid Automatic Repeat Request (HARQ) process number.

14. The method of claim 13, wherein the transmission mode of the uplink data is determined according to a preset condition, wherein the preset condition comprises at least one of:
a format of downlink control information;
display indication signaling in the downlink control information;
a value of a transmitted or scheduled burst length indicator field in the scheduling information;
a value of an uplink index in the scheduling information;
radio resource control (RRC) semi-persistent configuration signaling;
a specific Cell Radio Network Temporary Identifier (C-RNTI); or
a value of uplink scheduling interval (semiPersistSchedIntervalUL) being 1 which is a scheduling period parameter in RRC configuration information and a Semi-Persistent-Scheduled Cell Radio Network Temporary Identifier (SPS-C-RNTI).

15. The method of claim 13, wherein performing LBT according to the transmission mode comprises at least one of:
in response to determining that a first scheduled transmission subframe is a first uplink subframe, performing LBT on a full bandwidth; otherwise, performing LBT at a scheduled sub-band level or a scheduled RB level;
performing LBT on the full bandwidth in a first scheduled subframe, and performing LBT on a partial bandwidth at the scheduled sub-band level or the scheduled RB level in a subsequent scheduled subframe;
performing LBT on the full bandwidth in the first scheduled subframe, and performing LBT on a predefined pattern in the subsequent scheduled subframe;

after performing LBT successfully in a Kth scheduled subframe, not performing LBT in the subsequent scheduled subframe, and consecutively transmitting m scheduled uplink subframes or (m−k+1) remaining scheduled subframes, wherein m denotes a number of scheduled subframes in an uplink data burst;

performing LBT with back-off in the first scheduled subframe, and performing LBT without back-off or LBT with back-off values successively decreasing by one in the subsequent scheduled subframes; or in response to determining that the terminal sends scheduled data in an UL subframe N and determining that the terminal also needs to send the scheduled data in an UL subframe N+1, not performing clear channel assessment (CCA) before the subframe N+1.

16. The method of claim 13, wherein sending the uplink data to the base station according to the scheduling information comprises at least one of:

in response to determining that only a combination of parameters is in the scheduling information, transmitting each scheduled subframe in the uplink data according to the combination of parameters;

in response to determining that multiple New Data Indicators (NDIs) and Hybrid Automatic Repeat Request (HARQ) process numbers are in the scheduling information, transmitting the new data packet or the retransmitted data packet of each scheduled subframe in the uplink data according to the NDIs and the HARQ process numbers; or in response to determining that multiple NDIs and one HARQ process number are in the scheduling information, transmitting the new data packet according to the NDIs and a smallest one of corresponding HARQ process numbers and transmitting the a retransmitted data packet according to an original HARQ process number.

17. The method of claim 15, further comprising at least one of:

in response to failing to perform LBT according to the transmission mode, performing LBT at a second Clear Channel Assessment (CCA) position of the uplink data until the last scheduled subframe in the uplink data;

in response to failing to perform LBT according to the transmission mode, performing LBT at Clear Channel Assessment (CCA) of the subsequent scheduled subframe, in response to failing to perform LBT according to the transmission mode, continuing performing LBT, and in response to determining that a remaining length (m−k) of the uplink data is less than a threshold, stopping transmission, wherein m and k are positive integers and m is greater than k; or in response to failing to perform LBT according to the transmission mode, stopping transmission.

18. A data scheduling apparatus, comprising a computer device and a storage device storing computer executable instructions, wherein the computer executable instructions, when executed by the computer device, cause the computer device to:

configure scheduling information according to a predetermined scheduling mode of unlicensed uplink subframes, wherein the scheduling information is configured to instruct a terminal to transmit uplink data on an unlicensed frequency spectrum; and receive the uplink data sent by the terminal according to the scheduling information;

wherein the scheduling information comprises: public scheduling information common to all scheduled subframes in one uplink data burst and private scheduling information of each of the all scheduled subframes in the one uplink data burst, wherein the private scheduling information comprises at least one of: a Listen-Before-Talk (LBT) type, a New Data Indicator (NDI), a Redundancy Version (RV) or a Hybrid Automatic Repeat Request (HARQ) process number.

19. The apparatus of claim 18, wherein the computer executable instructions, when executed by the computer device, further cause the computer device to determine the scheduling mode according to a preset condition before the scheduling information is configured according to the predetermined scheduling mode of the unlicensed uplink subframes, wherein the preset condition comprises at least one of: a ratio of a downlink load to an uplink load of an unlicensed carrier is lower than a predefined threshold; a number of downlink subframes is less than a number of uplink subframes in one Transmission Opportunity (TXOP); or the uplink data consecutively fails to be received for k times on an unlicensed frequency spectrum within a predetermined period of time T, wherein k is an integer.

* * * * *

UNITED STATES PATENT AND TRADEMARK OFFICE
CERTIFICATE OF CORRECTION

PATENT NO. : 10,581,577 B2
APPLICATION NO. : 15/772770
DATED : March 3, 2020
INVENTOR(S) : Xincai Li Page 1 of 2

It is certified that error appears in the above-identified patent and that said Letters Patent is hereby corrected as shown below:

In Column 1, Line 2, below "SYSTEM" insert --CROSS REFERENCE TO RELATED APPLICATIONS This application is the U.S. National Stage Application under 35 U.S.C. § 371 of International Patent Application No. PCT/CN2016/102179, filed on Oct. 14, 2016, which claims priority to Chinese patent application No. CN 201510738692.4 filed on Nov. 3, 2015, the entire disclosure of each of which is hereby incorporated by reference.--.

In Column 5, Line 29, delete "the a" and insert --the--.

In Column 9, Line 31-32, delete "the a" and insert --the--.

In Column 12, Line 62, delete "sixe" and insert --size--.

In Column 13, Line 16, delete "reQuest" and insert --Request--.

In Column 14, Line 44, delete "retrasmitted" and insert --retransmitted--.

In Column 15, Line 10, delete "indexs" and insert --indexes--.

In Column 16, Line 66, delete "predefiend" and insert --predefined--.

In Column 19, Line 45-46, delete "of the of the" and insert --of the--.

In Column 20, Line 45, delete "bandwidth." and insert --bandwidth--.

In Column 26, Line 31, delete "reQuest" and insert --Request--.

In Column 27, Line 52, delete "transmission;" and insert --transmission.--.

In Column 29, Line 8, delete "reQuest" and insert --Request--.

Signed and Sealed this
Sixth Day of October, 2020

Andrei Iancu
*Director of the United States Patent and Trademark Office*

CERTIFICATE OF CORRECTION (continued)
U.S. Pat. No. 10,581,577 B2

In Column 37, Line 42, after "disclosure." insert --INDUSTRIAL APPLICABILITY
As described above, data scheduling and data transmission methods, data scheduling and data transmission apparatuses, and a data scheduling and transmission system provided by embodiments of the present disclosure have the following beneficial effects: scheduling information used for instructing a terminal to transmit uplink data on an unlicensed frequency spectrum is configured according to a predetermined scheduling mode of the unlicensed uplink subframes, and the uplink data sent by the terminal is received according to the scheduling information, and thus the signaling overheads are reduced and the uplink transmission rate on the unlicensed frequency spectrum is improved.--, as new paragraph.

In Column 41, Line 33, Claim 16, delete "the a" and insert --the--.